United States Patent
Fakoorian et al.

(10) Patent No.: US 10,602,453 B2
(45) Date of Patent: Mar. 24, 2020

(54) UPLINK POWER CONTROL IN WIRELESS SYSTEMS

(71) Applicant: QUALCOMM Incorporated, San Diego, CA (US)

(72) Inventors: Seyed Ali Akbar Fakoorian, San Diego, CA (US); Xiaoxia Zhang, San Diego, CA (US); Taesang Yoo, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/162,185

(22) Filed: Oct. 16, 2018

(65) Prior Publication Data
US 2019/0124598 A1    Apr. 25, 2019

Related U.S. Application Data

(60) Provisional application No. 62/575,245, filed on Oct. 20, 2017.

(51) Int. Cl.
*H04W 52/14*    (2009.01)
*H04W 52/18*    (2009.01)
(Continued)

(52) U.S. Cl.
CPC .......... *H04W 52/146* (2013.01); *H04B 7/024* (2013.01); *H04L 5/005* (2013.01);
(Continued)

(58) Field of Classification Search
CPC ..... H04W 52/24; H04W 52/42; H04W 52/14; H04W 52/146; H04W 52/18; H04B 7/06; H04B 7/0408
See application file for complete search history.

(56) References Cited

U.S. PATENT DOCUMENTS

| | | | |
|---|---|---|---|
| 10,361,831 B2 * | 7/2019 | Froberg Olsson .... | H04L 5/0053 |
| 2011/0243007 A1 | 10/2011 | Xiao et al. | |
| 2013/0039286 A1 * | 2/2013 | Larsson .............. | H04W 52/146 |
| | | | 370/329 |
| 2014/0016576 A1 * | 1/2014 | Noh ..................... | H04W 52/362 |
| | | | 370/329 |

(Continued)

FOREIGN PATENT DOCUMENTS

| WO | WO-2013155914 A1 | 10/2013 |
|---|---|---|
| WO | WO-2013165286 A1 | 11/2013 |
| WO | WO-2017146773 A1 | 8/2017 |

OTHER PUBLICATIONS

International Search Report and Written Opinion—PCT/US2018/056217—ISA/EPO—dated Jan. 4, 2019.
(Continued)

*Primary Examiner* — Blane J Jackson
(74) *Attorney, Agent, or Firm* — Liem T. Do

(57) ABSTRACT

Methods, systems, and devices for wireless communications are described. A base station may determine a set of power control parameters for a user equipment (UE) to use in different power control loops. The base station may indicate a power control process for the UE to perform in downlink control information. The UE may identify a subset of the power control parameters to use in a power control loop for the indicated process. In some examples, the power control parameters may be for different sounding reference signal processes, such as uplink channel sounding, downlink channel sounding with channel reciprocity, or cross-link interference. In some other examples, the power control parameters may be for power control loops of different uplink channel configuration. The base station may convey the set of power control parameters to the UE by radio resource control signaling.

24 Claims, 14 Drawing Sheets

(51) Int. Cl.

| | |
|---|---|
| *H04W 52/24* | (2009.01) |
| *H04W 52/28* | (2009.01) |
| *H04B 7/024* | (2017.01) |
| *H04L 5/00* | (2006.01) |
| *H04L 25/02* | (2006.01) |
| *H04W 52/10* | (2009.01) |
| *H04W 72/04* | (2009.01) |
| *H04W 52/58* | (2009.01) |
| *H04B 7/0456* | (2017.01) |
| *H04B 7/0404* | (2017.01) |
| *H04B 7/06* | (2006.01) |

(52) U.S. Cl.
CPC ........ *H04L 5/0035* (2013.01); *H04L 25/0226* (2013.01); *H04L 25/0228* (2013.01); *H04W 52/10* (2013.01); *H04W 52/247* (2013.01); *H04W 52/281* (2013.01); *H04W 72/042* (2013.01); *H04B 7/0404* (2013.01); *H04B 7/0456* (2013.01); *H04B 7/0617* (2013.01); *H04W 52/248* (2013.01); *H04W 52/58* (2013.01)

(56) References Cited

U.S. PATENT DOCUMENTS

| | | | |
|---|---|---|---|
| 2014/0153536 A1* | 6/2014 | Ouchi | H04W 52/146 370/329 |
| 2015/0201381 A1* | 7/2015 | Shin | H04W 52/08 455/522 |
| 2016/0165547 A1* | 6/2016 | Ouchi | H04W 52/146 455/522 |
| 2019/0075526 A1* | 3/2019 | Nagaraj | H04B 7/0408 |
| 2019/0104477 A1* | 4/2019 | MolavianJazi | H04B 7/0626 |
| 2019/0190747 A1* | 6/2019 | Park | H04L 5/005 |

OTHER PUBLICATIONS

Qualcomm Incorporated: "Remaining details on SRS", 3GPP Draft; R1-1718549, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017 Oct. 8, 2017, XP051341730, Retrieved from the Internet: URL:http://www.3gpp.org/ftp/Meetings_3GPP_SYNC/RAN1/Docs/ [retrieved on Oct. 8, 2017], 9 pages.

* cited by examiner

UPLINK POWER CONTROL IN WIRELESS SYSTEMS

CROSS REFERENCES

The present Application for Patent claims benefit of U.S. Provisional Patent Application No. 62/575,245 by FAKOORIAN et al., entitled "UPLINK POWER CONTROL IN WIRELESS SYSTEMS," filed Oct. 20, 2017, assigned to the assignee hereof, and expressly incorporated by reference in its entirety.

BACKGROUND

The following relates generally to wireless communications, and more specifically to uplink power control in wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-s-OFDM). A wireless multiple-access communications system may include a number of base stations or network access nodes, each simultaneously supporting communication for multiple communication devices, which may be otherwise known as user equipment (UE).

A base station may measure uplink channel conditions of a channel used by a UE based on a sounding reference signal (SRS) transmitted by the UE on the uplink channel. The base station may adjust the transmit power of the UE based on the SRS. In some wireless systems, SRS transmission may only be used for measuring uplink channel conditions. As such, the power-controlled UE may use some common values for power control loops of the SRS and the uplink channel. However, if the UE is capable of using an SRS to measure different kinds of channels or different conditions of an uplink channel, using values for an SRS power loop that are common to a generic uplink channel power loop may not consider factors unique to the different channels or different conditions of the uplink channel. Thus, the power control loops may have incorrect values, which may lead to incorrect power adjustments based on the channel conditions.

SUMMARY

A base station may determine a set of power control parameters for a user equipment (UE) to use in different power control loops. The UE may identify a subset of the power control parameters to use based on a process which is being power-controlled. For example, the set of power control parameters may include parameters for a number of different sounding reference signal (SRS) processes. The UE may identify power control parameters for an SRS power control loop based on the corresponding SRS process. The SRS processes may include, for example, uplink channel sounding, downlink channel sounding with channel reciprocity, and cross-link interference, among others. The base station may convey the set of power control parameters to the UE using a higher layer, for example by radio resource control (RRC) signaling. The base station may then indicate the SRS process to the UE in downlink control information (DCI). The UE may identify parameters corresponding to the indicated SRS process from the previously provided set of power control parameters. The identified parameters may be used for the power control loop. Similarly, the base station may configure a set of power control parameters for the UE to use in an uplink channel sounding based on different uplink channel configurations. For example, the base station may configure sets of power control parameters for coordinated multipoint (CoMP) configurations as well as non-CoMP configurations, among others. The base station may indicate the set of power control parameters for different uplink channel configurations by RRC signaling. The base station may then transmit an indication of the uplink channel configuration in DCI.

A method of wireless communications is described. The method may include determining, at a base station, a set of power control parameters for a channel, transmitting the set of power control parameters to a UE, identifying one of a plurality of processes for the channel, the identified process corresponding to a subset of power control parameters, and transmitting an indication of the identified process to the UE.

An apparatus for wireless communications is described. The apparatus may include means for determining, at a base station, a set of power control parameters for a channel, means for transmitting the set of power control parameters to a UE, means for identifying one of a plurality of processes for the channel, the identified process corresponding to a subset of power control parameters, and means for transmitting an indication of the identified process to the UE.

Another apparatus for wireless communications is described. The apparatus may include a processor, memory in electronic communication with the processor, and instructions stored in the memory. The instructions may be operable to cause the processor to determine, at a base station, a set of power control parameters for a channel, transmit the set of power control parameters to a UE, identify one of a plurality of processes for the channel, the identified process corresponding to a subset of power control parameters, and transmit an indication of the identified process to the UE.

A non-transitory computer-readable medium for wireless communications is described. The non-transitory computer-readable medium may include instructions operable to cause a processor to determine, at a base station, a set of power control parameters for a channel, transmit the set of power control parameters to a UE, identify one of a plurality of processes for the channel, the identified process corresponding to a subset of power control parameters, and transmit an indication of the identified process to the UE.

In some examples of the method, apparatus, and non-transitory computer-readable medium described above, transmitting the indication of the identified process to the UE comprises: transmitting, via DCI, a process index that corresponds to the identified process, a power control adjustment state that corresponds to the identified process, or a combination thereof.

Some examples of the method, apparatus, and non-transitory computer-readable medium described above may further include processes, features, means, or instructions for identifying the process index that corresponds to the identified process, the process index indicative of the subset of power control parameters.

In some examples of the method, apparatus, and non-transitory computer-readable medium described above, the power control adjustment state may be subframe dependent, slot dependent, or mini-slot dependent.

In some examples of the method, apparatus, and non-transitory computer-readable medium described above, determining the set of power control parameters comprises: configuring multiple sets of process-specific power control parameters.

In some examples of the method, apparatus, and non-transitory computer-readable medium described above, determining the set of power control parameters comprises: configuring multiple power control parameters for a plurality of channels.

In some examples of the method, apparatus, and non-transitory computer-readable medium described above, transmitting the set of power control parameters to the UE comprises: transmitting one or more power control parameters via RRC signaling.

In some examples of the method, apparatus, and non-transitory computer-readable medium described above, identifying the process comprises: selecting the process from a set of processes, the process capable of being performed by the UE.

In some examples of the method, apparatus, and non-transitory computer-readable medium described above, the identified process comprises a channel measurement process using a precoded SRS or an un-precoded SRS.

In some examples of the method, apparatus, and non-transitory computer-readable medium described above, the channel measurement process may be based at least in part on cross-link interference.

In some examples of the method, apparatus, and non-transitory computer-readable medium described above, the channel measurement process comprises a downlink channel sounding with channel reciprocity or an uplink channel sounding.

In some examples of the method, apparatus, and non-transitory computer-readable medium described above, the set of power control parameters comprises a power offset, an alpha value, a closed loop power control parameter, a transport format indicator, or a combination thereof.

In some examples of the method, apparatus, and non-transitory computer-readable medium described above, the identified process comprises a physical uplink shared channel (PUSCH) process and the set of power control parameters correspond to multiple PUSCH power control loops.

In some examples of the method, apparatus, and non-transitory computer-readable medium described above, the PUSCH process may be associated with a CoMP transmission, a non-CoMP transmission, an anchored uplink slot, a default uplink slot, a switched uplink slot, or any combination thereof.

A method of wireless communications is described. The method may include receiving, from a base station, a set of power control parameters for an uplink channel, receiving, from the base station, an indication of a process associated with the uplink channel, identifying a subset of power control parameters based at least in part on the indication of the process, and transmitting the uplink channel that corresponds to the process in accordance with the identified subset of the power control parameters.

An apparatus for wireless communications is described. The apparatus may include means for receiving, from a base station, a set of power control parameters for an uplink channel, means for receiving, from the base station, an indication of a process associated with the uplink channel, means for identifying a subset of power control parameters based at least in part on the indication of the process, and means for transmitting the uplink channel that corresponds to the process in accordance with the identified subset of the power control parameters.

Another apparatus for wireless communications is described. The apparatus may include a processor, memory in electronic communication with the processor, and instructions stored in the memory. The instructions may be operable to cause the processor to receive, from a base station, a set of power control parameters for an uplink channel, receive, from the base station, an indication of a process associated with the uplink channel, identify a subset of power control parameters based at least in part on the indication of the process, and transmit the uplink channel that corresponds to the process in accordance with the identified subset of the power control parameters.

A non-transitory computer-readable medium for wireless communications is described. The non-transitory computer-readable medium may include instructions operable to cause a processor to receive, from a base station, a set of power control parameters for an uplink channel, receive, from the base station, an indication of a process associated with the uplink channel, identify a subset of power control parameters based at least in part on the indication of the process, and transmit the uplink channel that corresponds to the process in accordance with the identified subset of the power control parameters.

In some examples of the method, apparatus, and non-transitory computer-readable medium described above, identifying the subset of power control parameters comprises: selecting the subset of power control parameters from the set of power control parameters based at least in part on the indication of the process.

In some examples of the method, apparatus, and non-transitory computer-readable medium described above, receiving the indication of the process comprises: receiving, via DCI, a process index that corresponds to the process, a power control adjustment state that corresponds to the process, or a combination thereof.

In some examples of the method, apparatus, and non-transitory computer-readable medium described above, the subset of power control parameters may be identified based at least in part on the process index.

In some examples of the method, apparatus, and non-transitory computer-readable medium described above, the power control adjustment state may be subframe dependent, slot dependent, or mini-slot dependent.

In some examples of the method, apparatus, and non-transitory computer-readable medium described above, receiving the set of power control parameters comprises: receiving one or more power control parameters via RRC signaling.

In some examples of the method, apparatus, and non-transitory computer-readable medium described above, the subset of power control parameters correspond to the process associated with the uplink channel.

Some examples of the method, apparatus, and non-transitory computer-readable medium described above may further include processes, features, means, or instructions for generating a precoded SRS or an un-precoded SRS based at least in part on a channel measurement process indicated by the process. Some examples of the method, apparatus, and non-transitory computer-readable medium described above may further include processes, features, means, or instructions for transmitting the uplink channel comprises transmitting the precoded SRS or the un-precoded SRS.

In some examples of the method, apparatus, and non-transitory computer-readable medium described above, the channel measurement process may be based at least in part on cross-link interference.

In some examples of the method, apparatus, and non-transitory computer-readable medium described above, the channel measurement process comprises a downlink channel sounding with channel reciprocity or an uplink channel sounding.

In some examples of the method, apparatus, and non-transitory computer-readable medium described above, the set of power control parameters comprises a power offset, an alpha value, a closed loop power control parameter, a transport format indicator, or a combination thereof.

In some examples of the method, apparatus, and non-transitory computer-readable medium described above, the process comprises a PUSCH process and the set of power control parameters correspond to multiple PUSCH power control loops. Some examples of the method, apparatus, and non-transitory computer-readable medium described above may further include processes, features, means, or instructions for transmitting the uplink channel comprises transmitting a PUSCH.

In some examples of the method, apparatus, and non-transitory computer-readable medium described above, the PUSCH process may be associated with a CoMP transmission, a non-CoMP transmission, an anchored uplink slot, a default uplink slot, a switched uplink slot, or any combination thereof.

DETAILED DESCRIPTION

Figure 1:
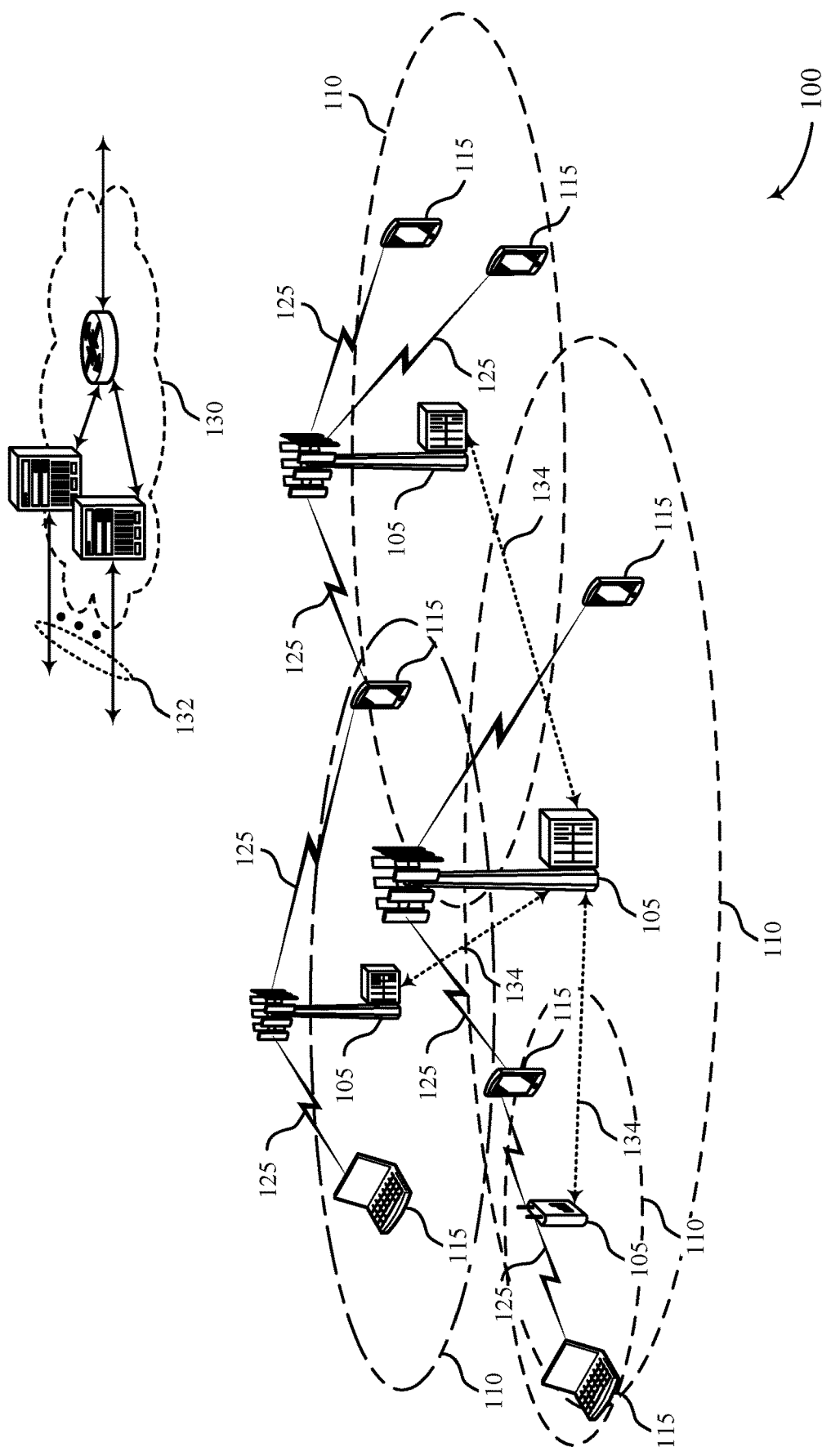
FIG. 1 illustrates an example of a wireless communications system that supports uplink power control in wireless systems in accordance with aspects of the present disclosure.

A base station may adjust a transmit power of a user equipment (UE) based on receiving a sounding reference signal (SRS). For example, the UE may transmit the SRS to the base station on an uplink channel and the base station may measure the received power of transmissions from the UE on the uplink channel based on the SRS. In some cases, the base station may identify channel conditions of the uplink channel based on the SRS. The base station may indicate adjustments for the transmit power of the UE based on the identified channel conditions. In some examples, the uplink channel may be a physical uplink shared channel (PUSCH). In some wireless systems, power control loops for SRS and PUSCH may include common parameters such as a power control adjustment state, a power offset, and an open loop power control. The common parameters may be appropriate when SRS is used for PUSCH channel state information (CSI) measurement. However, an SRS may have additional applications apart from measuring channel conditions of PUSCH. As such, some parameters used for PUSCH power control may not be applicable to power control schemes of the other applications or processes. Additionally, a static power control loop for PUSCH may not reflect power control conditions for different PUSCH configurations or processes. For example, some wireless devices may use a common power control loop for both coordinated multipoint (CoMP) transmission as well as non-CoMP transmissions, but these configurations may have different power control conditions.

Rather, a base station may determine a set of power control parameters for a UE to use in different power control loops. The UE may identify a subset of the power control parameters to use based on a process which is being power-controlled. For example, the set of power control parameters may include parameters for a number of different SRS processes. The UE may identify power control parameters for an SRS power control loop based on the corresponding SRS process. The SRS processes may include, for example, uplink channel sounding, downlink channel sounding with channel reciprocity, and cross-link interference, among others. The base station may convey the set of power control parameters to the UE using a higher layer, for example by radio resource control (RRC) signaling. The base station may then indicate the SRS process to the UE in downlink control information (DCI). The UE may identify parameters corresponding to the indicated SRS process from the previously provided set of power control parameters. The identified parameters may be used for the power control loop. Similarly, the base station may configure a set of power control parameters for the UE to use in an uplink channel sounding based on different uplink channel configurations. For example, the base station may configure sets of power control parameters for CoMP configurations as well as non-CoMP configurations, among others. The base station may indicate the set of power control parameters for different uplink channel configurations by RRC signaling. The base station may then transmit an indication of the uplink channel configuration in DCI.

Aspects of the disclosure are initially described in the context of a wireless communications system. Aspects of the disclosure are further illustrated by and described with reference to apparatus diagrams, system diagrams, and flowcharts that relate to uplink power control in wireless systems.

FIG. 1 illustrates an example of a wireless communications system 100 that supports uplink power control in wireless systems in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and the wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

The wireless communications system 100 may also operate in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, the wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, a base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, the wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or discrete Fourier transform-spread-OFDM (DFT-s-OFDM)).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

The wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, the wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems, such as NR systems, may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A base station 105 operating in the wireless communications system 100 may indicate sets of power control parameters to a UE 115. Power control loops for different SRS processes (e.g., uplink channel sounding, downlink channel sounding, cross-link interference (CLI) measurements, etc.) may use different parameters from the sets of parameters. The base station 105 may indicate an SRS process which the UE 115 performs and the UE 115 may use the corresponding power control parameters in a power control loop for the process. In some other examples, the base station 105 may indicate a set of power control parameters including parameters corresponding to different PUSCH processes or configurations. The base station 105 may indicate the PUSCH process and the UE 115 may use a corresponding subset of power control parameters for a PUSCH power control loop.

Figure 2:
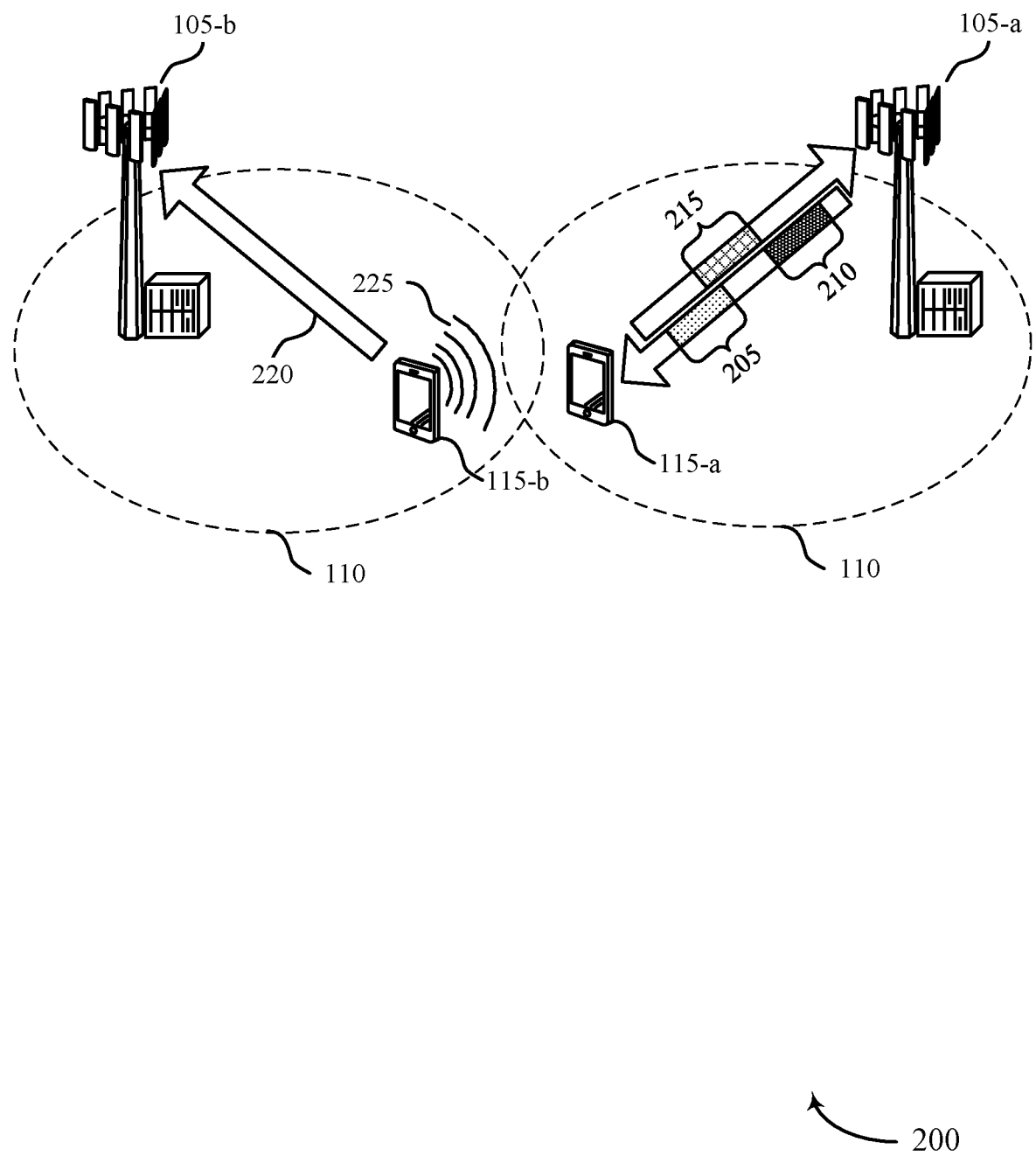
FIG. 2 illustrates an example of a wireless communications system that supports uplink power control in wireless systems in accordance with aspects of the present disclosure.

FIG. 2 illustrates an example of a wireless communications system 200 that supports uplink power control in wireless systems in accordance with aspects of the present disclosure. In some examples, the wireless communications system 200 may implement aspects of wireless communication system 100.

The wireless communications system 200 may include a first UE 115-$a$ and a second UE 115-$b$, each of which may be an example of a UE 115 as described with reference to FIG. 1. The wireless communications system 200 may also include a first base station 105-$a$ and a second base station 105-$b$, each of which may an example of a base station 105 as described with reference to FIG. 1. The first UE 115-$a$ may be in communication with the first base station 105-$a$ and the second UE 115-$b$ may be in communication with the second base station 105-$b$. In some examples, the second UE 115-$b$ may transmit on an uplink channel 220 while the first UE 115-$a$ receives downlink transmissions, which may result in UE-to-UE CLI 225.

In some wireless communications systems, the first base station 105-$a$ may adjust a transmit power of the first UE 115-$a$ based on receiving an SRS 215. The first UE 115-$a$ may transmit the SRS 215 to the first base station 105-$a$ on an uplink channel and the first base station 105-$a$ may measure the received power of transmissions from the first UE 115-$a$ on the uplink channel based on the SRS 215. In some examples, the first base station 105-$a$ may identify channel conditions of the uplink channel based on the SRS 215. The first base station 105-$a$ may then indicate adjustments for the transmit power of the first UE 115-$a$ based on the identified channel conditions. In some examples, the uplink channel may be a PUSCH.

In some wireless systems, transmit power control for SRS transmissions and transmissions using PUSCH may be related. For example, transmit power control for SRS transmissions may be determined according to a SRS power equation as represented in Equation 1.

$$P_{SRS(i)} = \min\{P_{CMAX}, P_{SRS\_OFFSET} + 10 \log_{10}(M_{SRS}) + P_{O\_PUSCH}(j) + \alpha(j)*PL + f(i)\} \quad (1)$$

Transmit power control for PUSCH may be determined according to a PUSCH power equation as represented in Equation 2.

$$P_{PUSCH}(i) = \min\{P_{CMAX}, 10 \log_{10}(M_{PUSCH}(i)) + P_{O\_PUSCH}(j) + \alpha(j)*PL + \Delta_{TF}(i) + f(i)\} \quad (2)$$

As shown, power control loops for SRS and PUSCH may include common parameters such as a power control adjustment state (e.g., f), power offset (e.g., $P_{O\_PUSCH}$), and open loop power control (e.g., $\alpha$ or alpha). The common parameters may be appropriate when an SRS 215 is used for a PUSCH CSI measurement. However, an SRS 215 may be used for applications other than measuring channel conditions of PUSCH. Additionally, the power control loop for PUSCH represented in Equation 2 may govern power control for multiple, different PUSCH configurations or processes. For example, Equation 2 may represent the power control for both CoMP transmission as well as non-CoMP transmissions, but these configurations may have different power control conditions.

The first UE 115-$a$ may transmit an SRS 215 for power control of a number of different channels or processes. For example, the first UE 115-$a$ may transmit the SRS 215 for power control of uplink channel sounding, downlink channel sounding with channel reciprocity, or for measuring CLI 225, or any combination thereof. In some examples, the SRS 215 for measuring the CLI 225 may be power controlled to reflect an interference tolerance level. For example, the first base station 105-$a$ may identify the CLI 225 and indicate for the aggressor UE (e.g., the second UE 115-$b$) to decrease transmission power. In some other examples, such as TRP-to-TRP CLI, the victim TRP may increase transmit power. The SRS 215 may be precoded or un-precoded.

The different SRS processes may use different power control loops. In some examples, some of the different power control loops may be independent from the PUSCH power control loop. Therefore, parameters used for one power control loop may not be appropriate for another power control loop.

The first base station 105-$a$ may configure a set of power control parameters 205 for the first UE 115-$a$ to use in SRS power control loops for each of the different SRS processes. The power control parameters 205 may include of a set of values for $P_{O\_SRS}$ and $\alpha$. The values identified by the first base station 105-$a$ may be process specific (e.g., for CLI measurement, uplink channel measurements, downlink channel with channel reciprocity measurements, etc.). For example, SRS process j may utilize $P_{O\_PUSCH}(j)$ and $\alpha(j)$ for the power control loop. The first base station 105-$a$ may indicate the set of power control parameters 205 to the first UE 115-$a$ using a higher layer, for example, by RRC signaling.

The first base station 105-$a$ may provide an indication of the SRS process to the first UE 115-$a$ in DCI 210. Based on the indicated process, the first UE 115-$a$ may select parameters corresponding to the indicated SRS process from the previously provided set of power control parameters. These parameters may be used for the power control loop. For example, if an UL-DL beam correspondence is indicated to the first UE 115-$a$, then a beam specific path loss may be used. In another example, in the absence of an indicator from the DCI 210, the first UE 115-$a$ may use a common path-loss for SRS power calculations.

For example, the first base station 105-$a$ may indicate the set of power control parameters 205 for a power control loop to the first UE 115-$a$ by RRC signaling. The power control parameters may include, for example, a power offset $P_{O\_SRS}$, a power control adjustment state, and an alpha value $\alpha$. The first base station 105-$a$ may then indicate an SRS process in the DCI 210 (e.g., the SRS process corresponds to a value j). The first UE 115-$a$ may identify the corresponding subset of parameters to use for the power control loop of the SRS process based on the set of power control parameters 205 and the indicated process (e.g., the subset of parameters are $P_{O\_PUSCH}(j)$ and $\alpha(j)$).

Power control adjustments may be based on a power control adjustment state. The power control adjustment state may be determined based on the SRS process and, in some examples, the slot of the power adjustment. For example, the power control adjustment for SRS process j at slot i may be f(i, j). The power control adjustment f(i, j) may be indicated explicitly in the DCI 210 to the first UE 115-*a*, or the first UE 115-*a* may implicitly determine f(i, j) based on the SRS process (e.g., from j). In some examples, the first base station 105-*a* may signal the value of f(i, j) to the first UE 115-*a* in the DCI 210, thereby dynamically configuring the power control adjustment state. In another example, the first UE 115-*a* may determine f(i, j) based on the specific SRS process. In the case of measuring UE-UE CLI 225, a fine step transmission power control may be used, and the first UE 115-*a* may implicitly determine the granularity of the step based on the indicated process j. The power control adjustment state may be accumulated or absolute.

The first UE 115-*a* may also use SRS for determining channel conditions of uplink channels such as PUSCH. However, different PUSCH control power loops may be appropriate for different PUSCH configurations. For example, PUSCH processes may be for non-CoMP transmission or CoMP transmission. In some instances, the interference level experienced at a base station 105 may be less for PUSCH with CoMP joint reception than with non-CoMP PUSCH. In another example, there may be PUSCH processes for the anchored uplink slots that may not suffer from CLI in dynamic TDD or for uplink slots that may suffer from CLI in dynamic TDD. In another example, there may be PUSCH with default uplink slots, which may suffer from CLI. In some other examples, there may be PUSCH with switched uplink slots, which may cause CLI. A PUSCH process for switched uplink slots may cause CLI to other UEs 115 in dynamic TDD and the UE 115 operating according to a switched uplink configuration may decrease transmission power to minimize the impact of CLI.

Similar to the different SRS processes, the first base station 105-*a* may configure a set of power control parameters for the first UE 115-*a* to use in power control loops for the different PUSCH processes. The power control parameters may include of a set of values for both $P_{O\_PUSCH}$ and $\alpha$. The values identified by the first base station 105-*a* may be process specific. For example, PUSCH process j may utilize $P_{O\_PUSCH}(j)$ and $\alpha(j)$ for the power control loop. The first base station 105-*a* may indicate to the first UE 115-*a* the sets of values. The first base station 105-*a* may indicate these values to the first UE 115-*a* using a higher layer, such as RRC.

The first base station 105-*a* may provide an indication of the PUSCH process to the first UE 115-*a* in the DCI 210. In some cases, the first UE 115-*a* may identify a power control adjustment state based on the indicated PUSCH process or the slot, or both. In some cases, the first base station 105-*a* may explicitly indicate the power control adjustment state to the first UE 115-*a* in the DCI 210. In some other examples, the first UE 115-*a* may implicitly determine the power control adjustment state based on the PUSCH configuration. The first UE 115-*a* may identify parameters for a power control loop based on the corresponding PUSCH process as indicated in the DCI 210.

The first UE 115-*a* may use SRS for path loss calculation and UE 115-*a* may be configured with one or more SRS resources such as time-frequency resources, sequences, cyclic shifts, periodicity, or any combination thereof. The first base station 105-*a* may transmit configuration signaling or measurement triggering mechanisms to the first UE 115-*a* to configure the SRS resources. In some cases, SRS resources may be explicitly configured to avoid SRS blind acquisition by UE 115-*a*.

In some cases, a downlink reference signal may be used for a path loss calculation for uplink power control. For example, if the power offset between a secondary synchronization signal (SSS) and a demodulation reference signal (DMRS) for a physical broadcast channel (PBCH) is known by UE 115-*a*, both the SSS and DMRS for the PBCH of a synchronization signal (SS) block may be used for a path loss calculation. In another example, the power offset between SSS and DMRS for PBCH may not be known by the first UE 115-*a*, and the UE 115-*a* may use just the SSS of SS block for path loss calculation. In some implementations, there may be beam specific path-loss for uplink power control. In some other implementations a base station may configure one or more groups where each group contains one or more SRSs resources to UE 115-*a*. Different groups may have different purposes, such as beam management, CSI acquisition, or uplink CSI acquisition.

In one example, the UE 115-*a* may use open-loop power control parameters for PUSCH. For example, base station 105-*a* may configure one or more power offset values. The offset values may correspond to specific combinations of one or more beams, waveform types, and service types as agreed upon. The base station 105-*a* may, in some examples, configure one or more alpha values.

Figure 3:
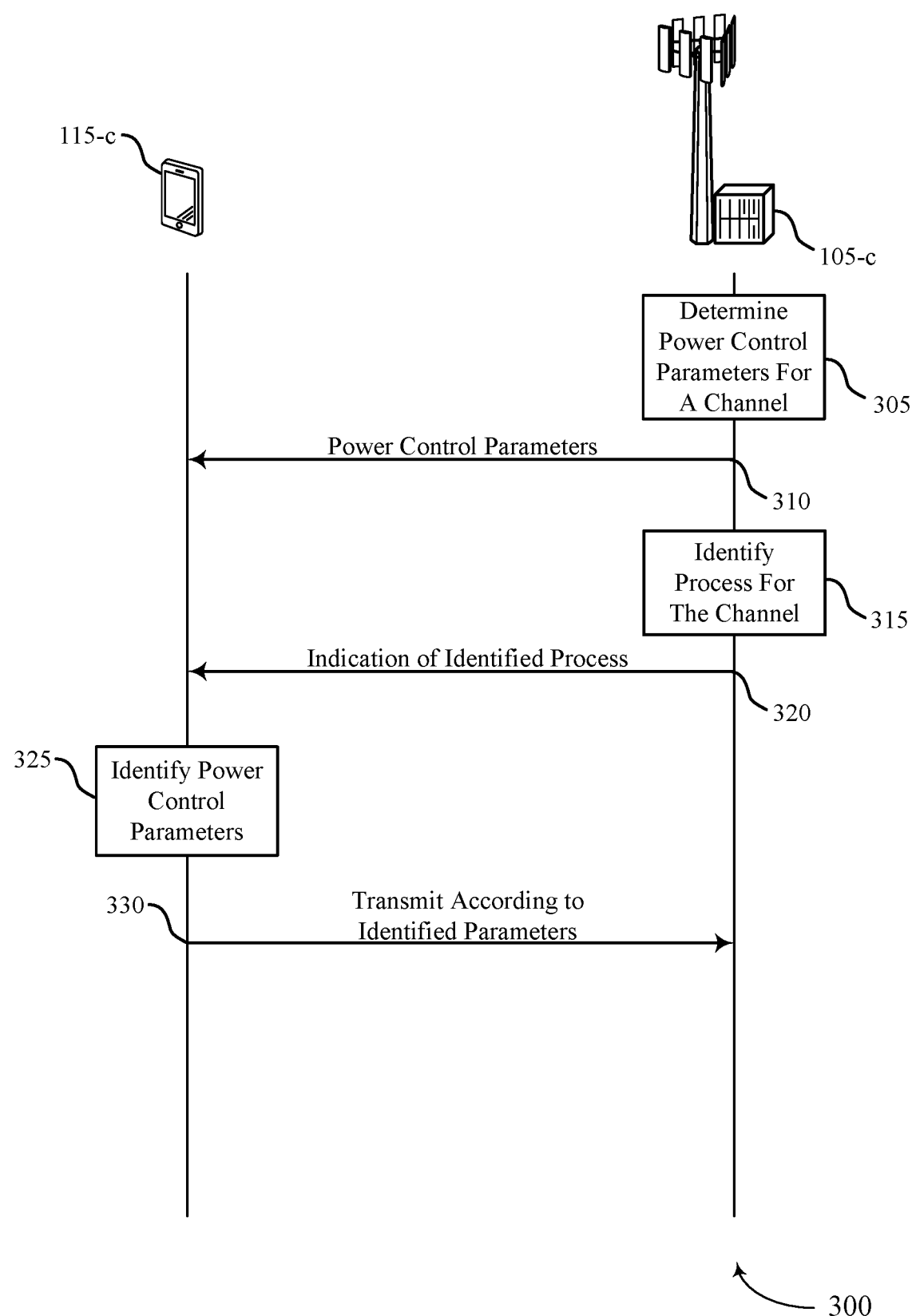
FIG. 3 illustrates an example of a process flow that supports uplink power control in wireless systems in accordance with aspects of the present disclosure.

FIG. 3 illustrates an example of a process flow 300 that supports uplink power control in wireless systems in accordance with aspects of the present disclosure. In some examples, the process flow 300 may implement aspects of wireless communication system 100. The process flow 300 may include UE 115-*c* and base station 105-*c*, which may be respective examples of a UE 115 and a base station 105 as described with reference to FIGS. 1 and 2.

At 305, the base station 105-*c* determines a set of power control parameters for a channel. In some examples, the base station 105-*c* may configure multiple power control parameters for a set of channels. The power control parameters may include a power offset, an alpha value, a closed loop power control parameter, a transport format indicator, or a combination thereof.

At 310, the base station 105-*c* may transmit the set of power control parameters to the UE 115-*c*. In some examples, the base station 105-*c* may transmit the one or more power control parameters via RRC signaling.

At 315, the base station 105-*c* may identify one of a set of processes for the channel, where the identified process may correspond to a subset of power control parameters. In some cases, the base station 105-*c* may select the process from a set of processes and the UE 115-*c* may be capable of performing the selected process. For example, the identified process may include a channel measurement process using a precoded SRS or an un-precoded SRS. In some cases, the channel measurement process may be based on CLI. In some other examples, the channel measurement process may include a downlink channel sounding with channel reciprocity.

In some other examples, the channel measurement process may include an uplink channel sounding. In some cases, the identified process may include a PUSCH process, and the set of power control parameters may correspond to multiple PUSCH power control loops. The PUSCH may be associated with CoMP or non-CoMP transmission, an anchored uplink slot, a default uplink slot, a switched uplink slot, or any combination thereof.

At 320, the base station 105-*c* may transmit an indication of the identified process to the UE 115-*c*. The transmission may include transmitting, via DCI, a process index that corresponds to the identified process, a power control adjustment state that corresponds to the identified process, or a combination thereof. In some examples, power control adjustment state may be subframe dependent, slot dependent, or mini-slot dependent. The transmission may include identifying the process index that corresponds to the identified process, and the process index may be indicative of the subset of power control parameters. In some examples, the UE 115-*c* may generate a precoded SRS or un-precoded SRS based on a channel measurement process indicated by the process.

At 325, the UE 115-*c* may identify a subset of power control parameters based on the indication of the process. In some examples, UE 115-*c* may select the subset of power control parameters from the set of power control parameters based on the indication of the process.

At 330, the UE 115-*c* may transmit the uplink channel that corresponds to the process in accordance with the identified subset of the power control parameters. In some examples, the UE may transmit the precoded or un-precoded SRS.

Figure 4:
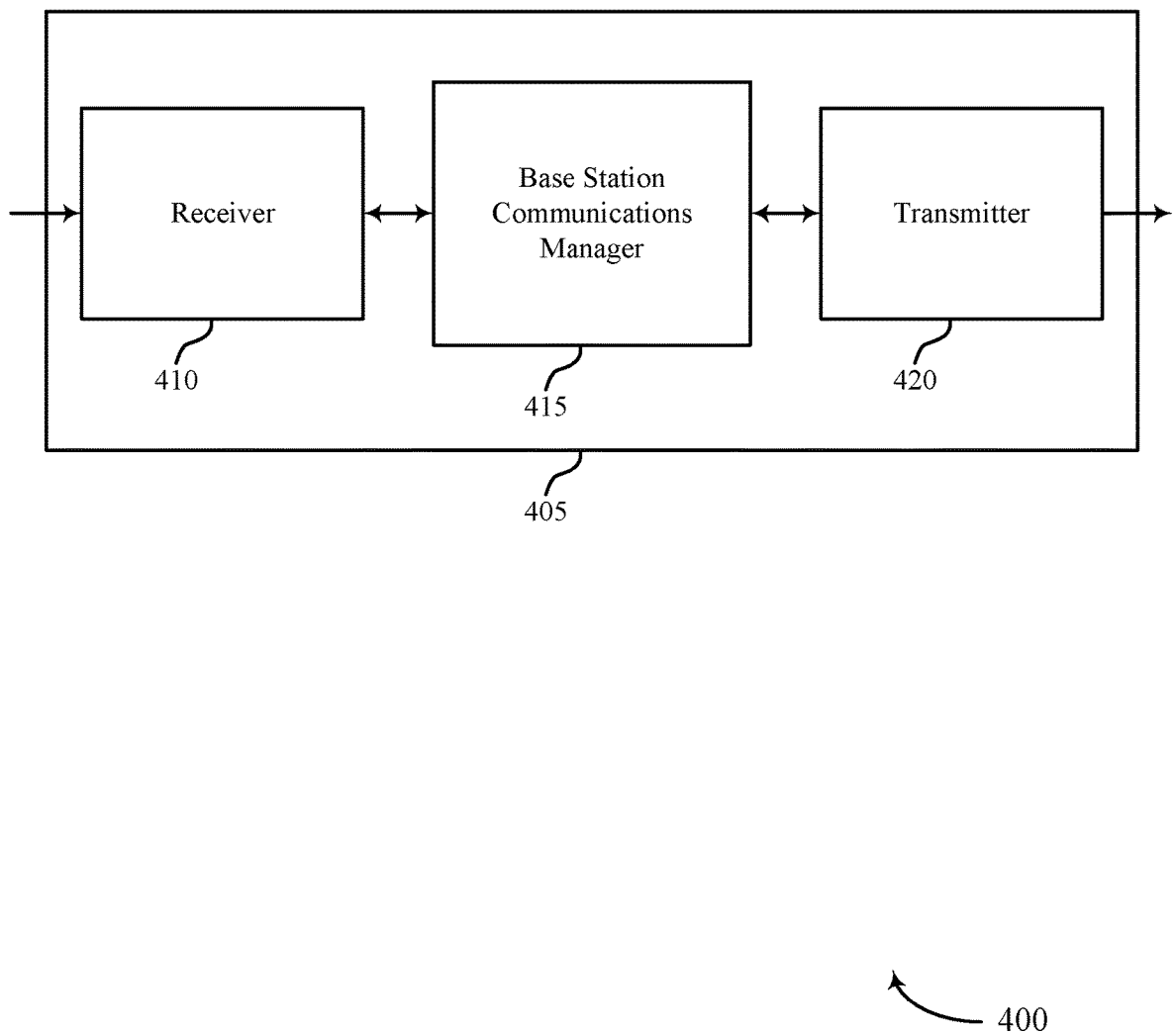
FIGS. 4 and 5 show block diagrams of wireless devices that support uplink power control in wireless systems in accordance with aspects of the present disclosure.

FIG. 4 shows a block diagram 400 of a wireless device 405 that supports uplink power control in wireless systems in accordance with aspects of the present disclosure. The wireless device 405 may be an example of aspects of a base station 105 as described herein. The wireless device 405 may include a receiver 410, a base station communications manager 415, and a transmitter 420. The wireless device 405 may also include a processor. Each of these components may be in communication with one another (e.g., via one or more buses).

The receiver 410 may receive information such as packets, user data, or control information associated with various information channels (e.g., control channels, data channels, and information related to uplink power control in wireless systems, etc.). Information may be passed on to other components of the device. The receiver 410 may be an example of aspects of the transceiver 735 described with reference to FIG. 7. The receiver 410 may utilize a single antenna or a set of antennas.

The base station communications manager 415 may be an example of aspects of the base station communications manager 715 described with reference to FIG. 7.

The base station communications manager 415 and/or at least some of its various sub-components may be implemented in hardware, software executed by a processor, firmware, or any combination thereof. If implemented in software executed by a processor, the functions of the base station communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station communications manager 415 and/or at least some of its various sub-components may be physically located at various positions, including being distributed such that portions of functions are implemented at different physical locations by one or more physical devices. In some examples, the base station communications manager 415 and/or at least some of its various sub-components may be a separate and distinct component in accordance with aspects of the present disclosure. In other examples, the base station communications manager 415 and/or at least some of its various sub-components may be combined with one or more other hardware components, including but not limited to an I/O component, a transceiver, a network server, another computing device, one or more other components described in the present disclosure, or a combination thereof in accordance with aspects of the present disclosure.

The base station communications manager 415 may determine, at a base station, a set of power control parameters for a channel, transmit the set of power control parameters to a UE, identify one of a set of processes for the channel, the identified process corresponding to a subset of power control parameters, and transmit an indication of the identified process to the UE.

The transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
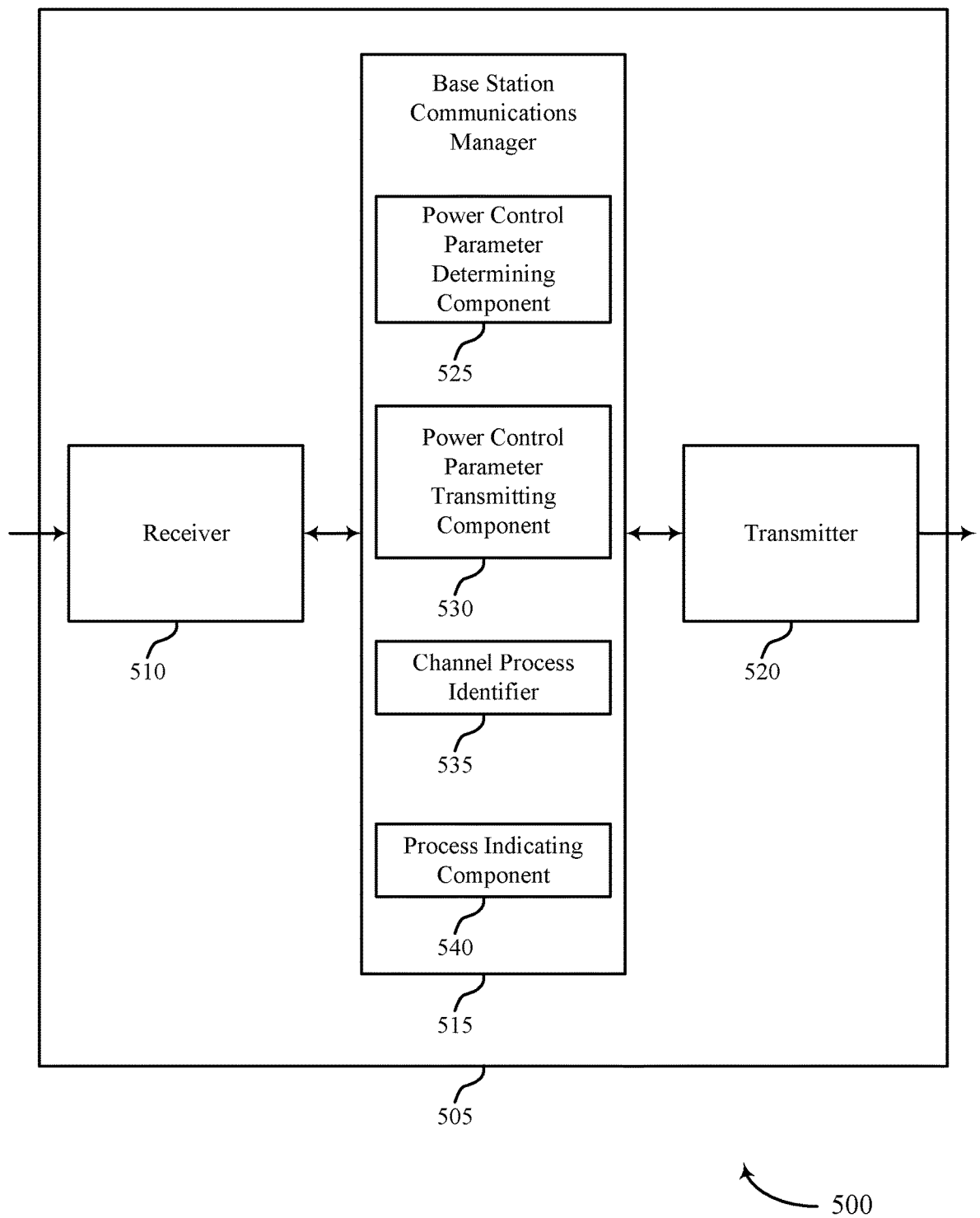

FIG. 5 shows a block diagram 500 of a wireless device 505 that supports uplink power control in wireless systems in accordance with aspects of the present disclosure. The wireless device 505 may be an example of aspects of a wireless device 405 or a base station 105 as described with reference to FIG. 4. The wireless device 505 may include a receiver 510, a base station communications manager 515, and a transmitter 520. The wireless device 505 may also include a processor. Each of these components may be in communication with one another (e.g., via one or more buses).

The receiver 510 may receive information such as packets, user data, or control information associated with various information channels (e.g., control channels, data channels, and information related to uplink power control in wireless systems, etc.). Information may be passed on to other components of the device. The receiver 510 may be an example of aspects of the transceiver 735 described with reference to FIG. 7. The receiver 510 may utilize a single antenna or a set of antennas.

The base station communications manager 515 may be an example of aspects of the base station communications manager 715 described with reference to FIG. 7. The base station communications manager 515 may also include a power control parameter determining component 525, a power control parameter transmitting component 530, a channel process identifier 535, and a process indicating component 540.

The power control parameter determining component 525 may determine, at a base station, a set of power control parameters for a channel. In some cases, determining the set of power control parameters includes: configuring multiple sets of process-specific power control parameters. In some examples, determining the set of power control parameters includes: configuring multiple power control parameters for a set of channels. In some instances, the set of power control parameters includes a power offset, an alpha value, a closed loop power control parameter, a transport format indicator, or a combination thereof.

The power control parameter transmitting component 530 may transmit the set of power control parameters to a UE. In some aspects, transmitting the set of power control parameters to the UE includes transmitting one or more power control parameters via RRC signaling.

The channel process identifier 535 may identify one of a set of processes for the channel, the identified process corresponding to a subset of power control parameters. In some cases, identifying the process includes: selecting the process from a set of processes, the process capable of being performed by the UE. In some aspects, the identified process includes a channel measurement process using a precoded SRS or an un-precoded SRS. In some examples, the channel measurement process is based on cross-link interference. In some instances, the channel measurement process includes a downlink channel sounding with channel reciprocity or an uplink channel sounding. In some cases, the identified process includes a PUSCH process and the set of power control parameters correspond to multiple PUSCH power control loops. In some aspects, the PUSCH process is associated with a CoMP transmission, a non-CoMP transmission, an anchored uplink slot, a default uplink slot, a switched uplink slot, or any combination thereof.

The process indicating component 540 may transmit an indication of the identified process to the UE and identify the process index that corresponds to the identified process, the process index indicative of the subset of power control parameters. In some cases, transmitting the indication of the identified process to the UE includes transmitting, via DCI, a process index that corresponds to the identified process, a power control adjustment state that corresponds to the identified process, or a combination thereof. In some aspects, the power control adjustment state is subframe dependent, slot dependent, or mini-slot dependent.

The transmitter 520 may transmit signals generated by other components of the device. In some examples, the transmitter 520 may be collocated with the receiver 510 in a transceiver module. For example, the transmitter 520 may be an example of aspects of the transceiver 735 described with reference to FIG. 7. The transmitter 520 may utilize a single antenna or a set of antennas.

Figure 6:
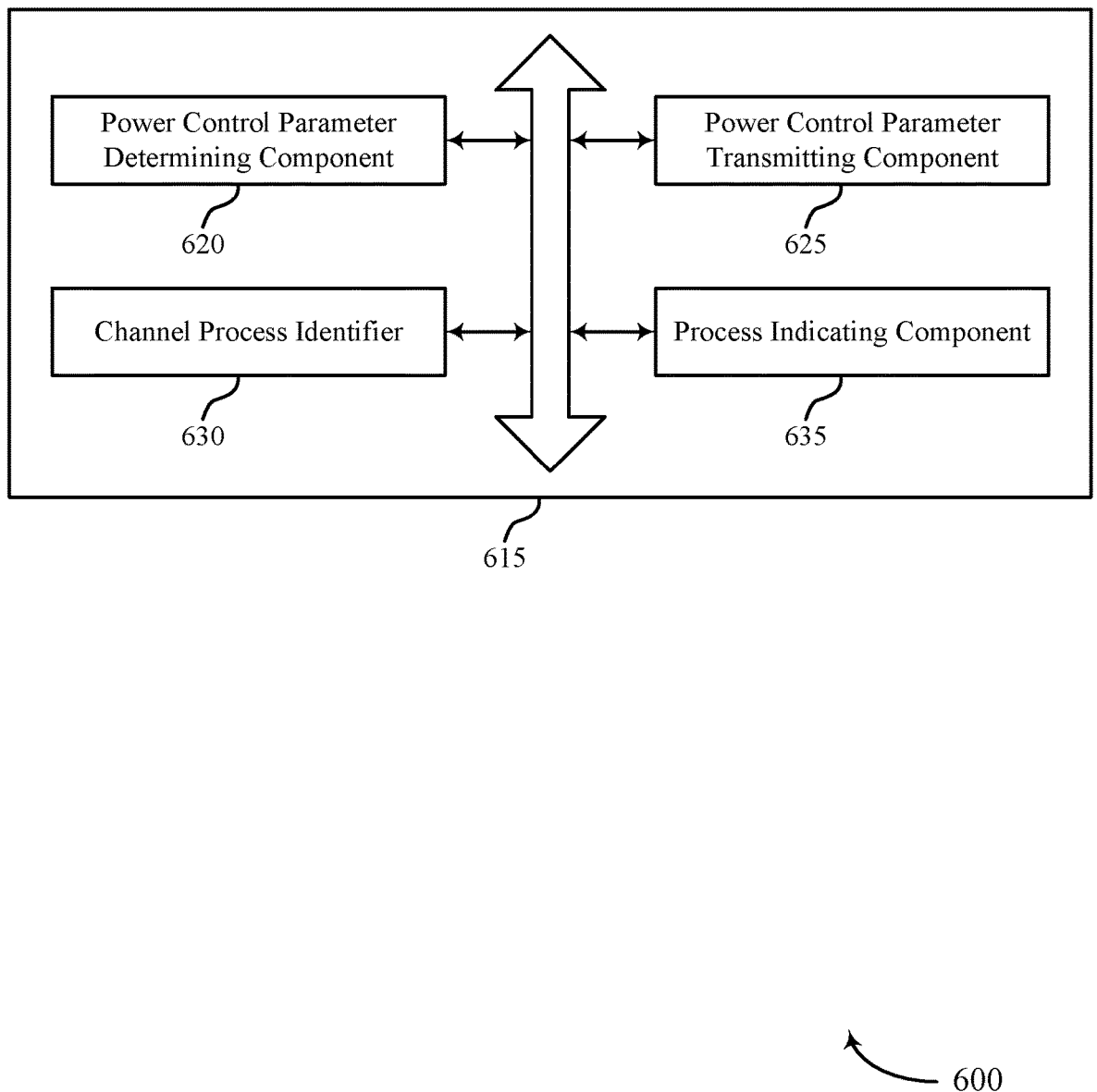
FIG. 6 shows a block diagram of a base station communications manager that supports uplink power control in wireless systems in accordance with aspects of the present disclosure.

FIG. 6 shows a block diagram 600 of a base station communications manager 615 that supports uplink power control in wireless systems in accordance with aspects of the present disclosure. The base station communications manager 615 may be an example of aspects of a base station communications manager 415, a base station communications manager 515, or a base station communications manager 715 described with reference to FIGS. 4, 5, and 7. The base station communications manager 615 may include a power control parameter determining component 620, a power control parameter transmitting component 625, a channel process identifier 630, and a process indicating component 635. Each of these modules may communicate, directly or indirectly, with one another (e.g., via one or more buses).

The power control parameter determining component 620 may determine, at a base station 105, a set of power control parameters for a channel. In some cases, determining the set of power control parameters includes: configuring multiple sets of process-specific power control parameters. In some cases, determining the set of power control parameters includes: configuring multiple power control parameters for a set of channels. In some cases, the set of power control parameters includes a power offset, an alpha value, a closed loop power control parameter, a transport format indicator, or a combination thereof.

The power control parameter transmitting component 625 may transmit the set of power control parameters to a UE. In some cases, transmitting the set of power control parameters to the UE includes transmitting one or more power control parameters via RRC signaling.

The channel process identifier 630 may identify one of a set of processes for the channel, the identified process corresponding to a subset of power control parameters. In some cases, identifying the process includes: selecting the process from a set of processes, the process capable of being performed by the UE. In some cases, the identified process includes a channel measurement process using a precoded SRS or an un-precoded SRS. In some cases, the channel measurement process is based on cross-link interference. In some cases, the channel measurement process includes a downlink channel sounding with channel reciprocity or an uplink channel sounding. In some cases, the identified process includes a PUSCH process and the set of power control parameters correspond to multiple PUSCH power control loops. In some cases, the PUSCH process is associated with a CoMP transmission, a non-CoMP transmission, an anchored uplink slot, a default uplink slot, a switched uplink slot, or any combination thereof.

The process indicating component 635 may transmit an indication of the identified process to the UE and identify the process index that corresponds to the identified process, the process index indicative of the subset of power control parameters. In some cases, transmitting the indication of the identified process to the UE includes transmitting, via DCI, a process index that corresponds to the identified process, a power control adjustment state that corresponds to the identified process, or a combination thereof. In some cases, the power control adjustment state is subframe dependent, slot dependent, or mini-slot dependent.

Figure 7:
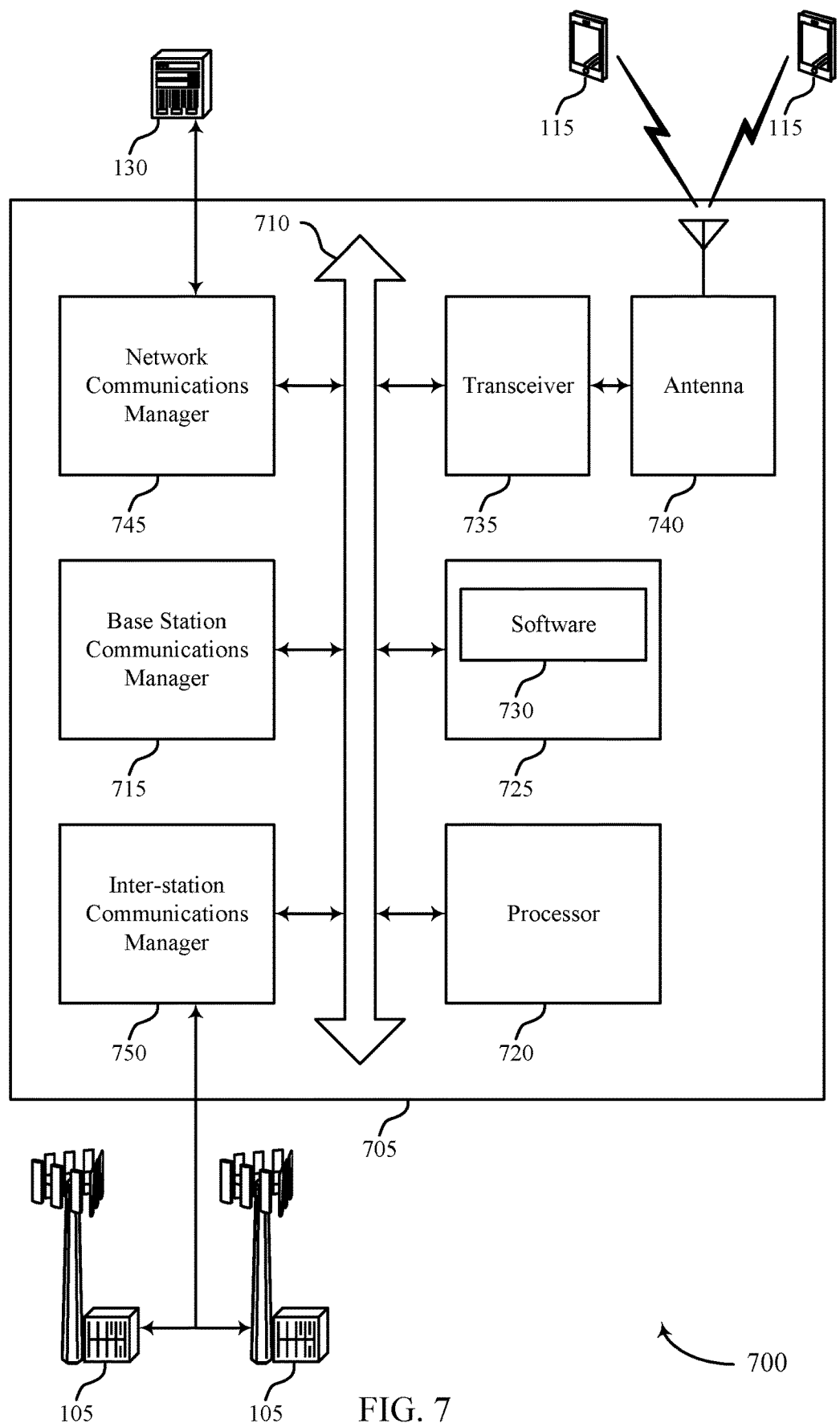
FIG. 7 shows a block diagram of a system including a device that supports uplink power control in wireless systems in accordance with aspects of the present disclosure.

FIG. 7 shows a block diagram of a system 700 including a device 705 that supports uplink power control in wireless systems in accordance with aspects of the present disclosure. The device 705 may be an example of or include the components of wireless device 405, wireless device 505, or a base station 105 as described above, e.g., with reference to FIGS. 4 and 5. The device 705 may include components for bi-directional voice and data communications including components for transmitting and receiving communications, including a base station communications manager 715, a processor 720, memory 725, software 730, a transceiver 735, an antenna 740, a network communications manager 745, and an inter-station communications manager 750. These components may be in electronic communication via one or more buses (e.g., bus 710). The device 705 may communicate wirelessly with one or more UEs.

The processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 720 may be configured to operate a memory array using a memory controller. In other cases, a memory controller may be integrated into the processor 720. The processor 720 may be configured to execute computer-readable instructions stored in a memory to perform various functions (e.g., functions or tasks supporting uplink power control in wireless systems).

The memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

The software 730 may include code to implement aspects of the present disclosure, including code to support uplink power control in wireless systems. The software 730 may be stored in a non-transitory computer-readable medium such as system memory or other memory. In some cases, the software 730 may not be directly executable by the processor but may cause a computer (e.g., when compiled and executed) to perform functions described herein.

The transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

The network communications manager 745 may manage communications with the core network (e.g., via one or more wired backhaul links). For example, the network communications manager 745 may manage the transfer of data communications for client devices, such as one or more UEs.

The inter-station communications manager 750 may manage communications with other base station and may include a controller or scheduler for controlling communications with UEs in cooperation with other base stations. For example, the inter-station communications manager 750 may coordinate scheduling for transmissions to UEs for various interference mitigation techniques such as beamforming or joint transmission. In some examples, the inter-station communications manager 750 may provide an X2 interface within an LTE/LTE-A wireless communication network technology to provide communication between base stations.

Figure 8:
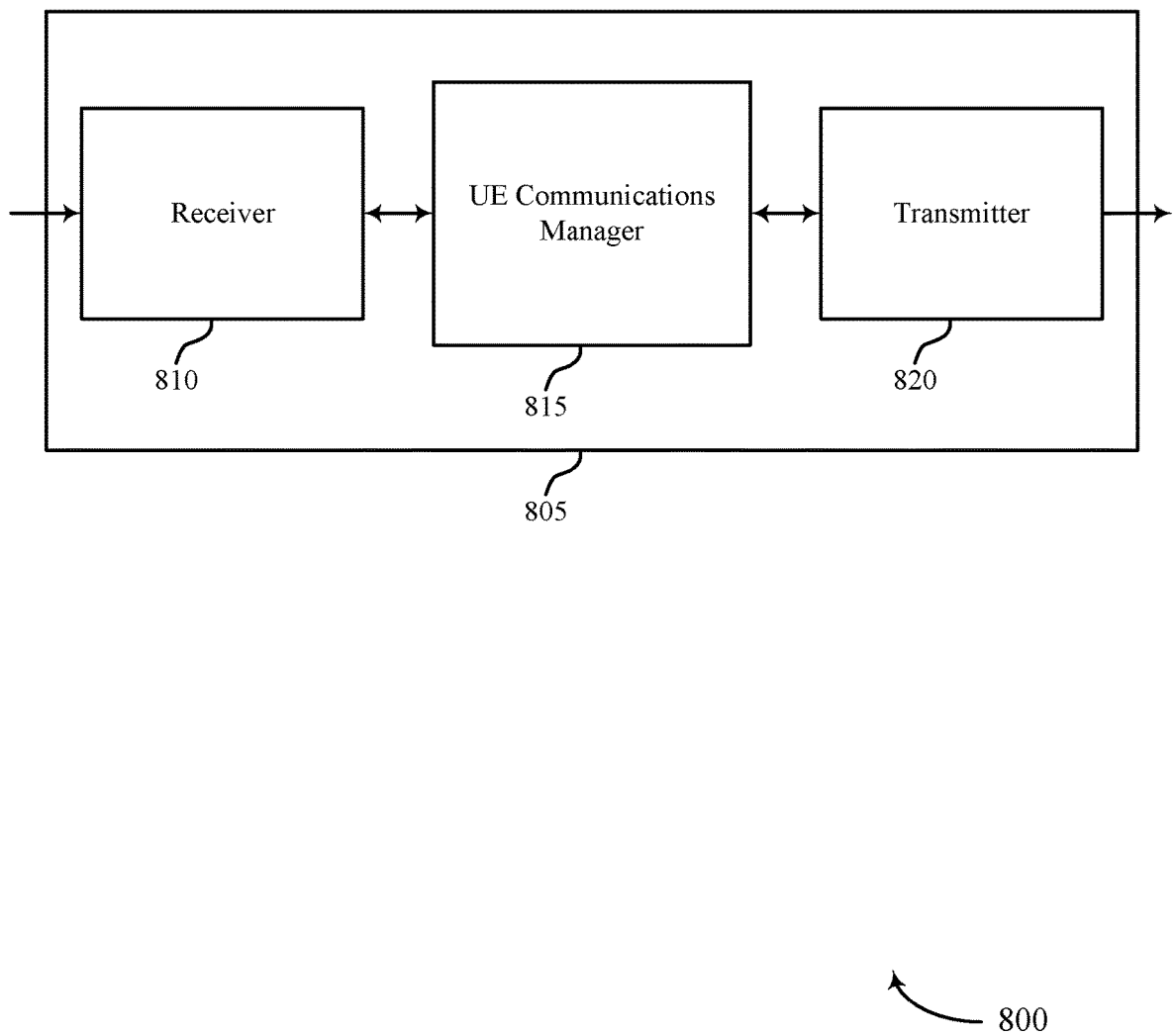
FIGS. 8 and 9 show block diagrams of wireless devices that support uplink power control in wireless systems in accordance with aspects of the present disclosure.

FIG. 8 shows a block diagram 800 of a wireless device 805 that supports uplink power control in wireless systems in accordance with aspects of the present disclosure. The wireless device 805 may be an example of aspects of a UE 115 as described herein. The wireless device 805 may include a receiver 810, a UE communications manager 815, and a transmitter 820. The wireless device 805 may also include a processor. Each of these components may be in communication with one another (e.g., via one or more buses).

The receiver 810 may receive information such as packets, user data, or control information associated with various information channels (e.g., control channels, data channels, and information related to uplink power control in wireless systems, etc.). Information may be passed on to other components of the device. The receiver 810 may be an example of aspects of the transceiver 1135 described with reference to FIG. 11. The receiver 810 may utilize a single antenna or a set of antennas.

The UE communications manager 815 may be an example of aspects of the UE communications manager 1115 described with reference to FIG. 11.

The UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE communications manager 815 and/or at least some of its various sub-components may be physically located at various positions, including being distributed such that portions of functions are implemented at different physical locations by one or more physical devices. In some examples, the UE communications manager 815 and/or at least some of its various sub-components may be a separate and distinct component in accordance with aspects of the present disclosure. In other examples, the UE communications manager 815 and/or at least some of its various sub-components may be combined with one or more other hardware components, including but not limited to an I/O component, a transceiver, a network server, another computing device, one or more other components described in the present disclosure, or a combination thereof in accordance with aspects of the present disclosure.

The UE communications manager 815 may receive, from a base station, a set of power control parameters for an uplink channel, receive, from the base station, an indication of a process associated with the uplink channel, identify a subset of power control parameters based on the indication of the process, and transmit the uplink channel that corresponds to the process in accordance with the identified subset of the power control parameters.

The transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
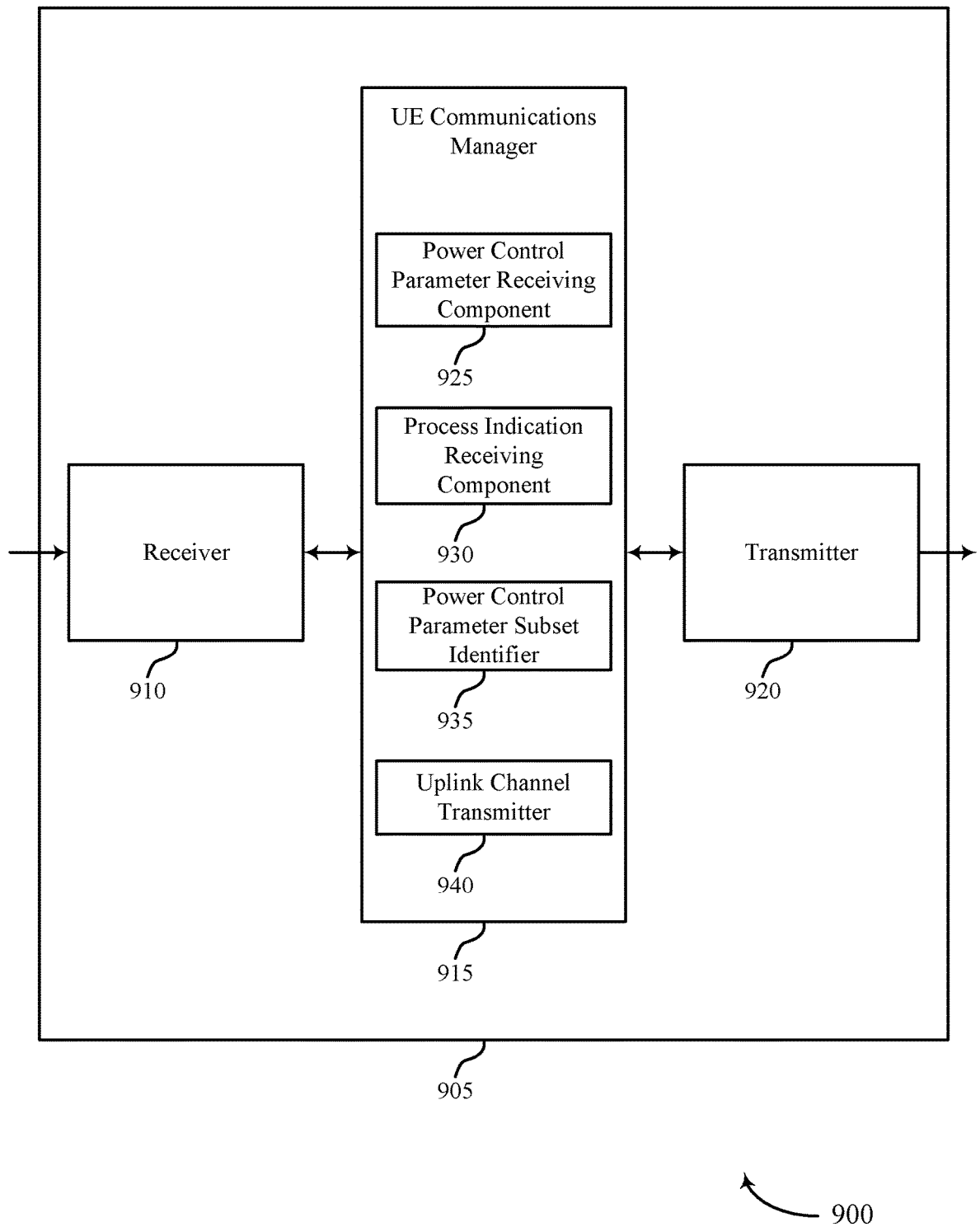

FIG. 9 shows a block diagram 900 of a wireless device 905 that supports uplink power control in wireless systems in accordance with aspects of the present disclosure. The wireless device 905 may be an example of aspects of a wireless device 805 or a UE 115 as described with reference to FIG. 8. The wireless device 905 may include receiver 910, UE communications manager 915, and transmitter 920. The wireless device 905 may also include a processor. Each of these components may be in communication with one another (e.g., via one or more buses).

The receiver 910 may receive information such as packets, user data, or control information associated with various information channels (e.g., control channels, data channels, and information related to uplink power control in wireless systems, etc.). Information may be passed on to other components of the device. The receiver 910 may be an example of aspects of the transceiver 1135 described with reference to FIG. 11. The receiver 910 may utilize a single antenna or a set of antennas.

The UE communications manager 915 may be an example of aspects of the UE communications manager 1115 described with reference to FIG. 11.

The UE communications manager 915 may also include a power control parameter receiving component 925, a process indication receiving component 930, a power control parameter subset identifier 935, and an uplink channel transmitter 940.

The power control parameter receiving component 925 may receive, from a base station, a set of power control parameters for an uplink channel. In some cases, receiving the set of power control parameters includes: receiving one or more power control parameters via RRC signaling. In some cases, the set of power control parameters includes a power offset, an alpha value, a closed loop power control parameter, a transport format indicator, or a combination thereof.

The process indication receiving component 930 may receive, from the base station, an indication of a process associated with the uplink channel. In some cases, receiving the indication of the process includes: receiving, via DCI, a process index that corresponds to the process, a power control adjustment state that corresponds to the process, or a combination thereof. In some cases, the process includes a PUSCH process and the set of power control parameters correspond to multiple PUSCH power control loops. In some cases, the PUSCH process is associated with a CoMP transmission, a non-CoMP transmission, an anchored uplink slot, a default uplink slot, a switched uplink slot, or any combination thereof.

The power control parameter subset identifier 935 may identify a subset of power control parameters based on the indication of the process. In some cases, identifying the subset of power control parameters includes: selecting the subset of power control parameters from the set of power control parameters based on the indication of the process. In some cases, the subset of power control parameters is identified based on the process index. In some cases, the power control adjustment state is subframe dependent, slot dependent, or mini-slot dependent. In some cases, the subset of power control parameters corresponds to the process associated with the uplink channel.

The uplink channel transmitter 940 may transmit the uplink channel that corresponds to the process in accordance with the identified subset of the power control parameters, transmit the uplink channel includes transmitting the pre-coded SRS or the un-precoded SRS, and transmit the uplink channel includes transmitting a PUSCH.

The transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
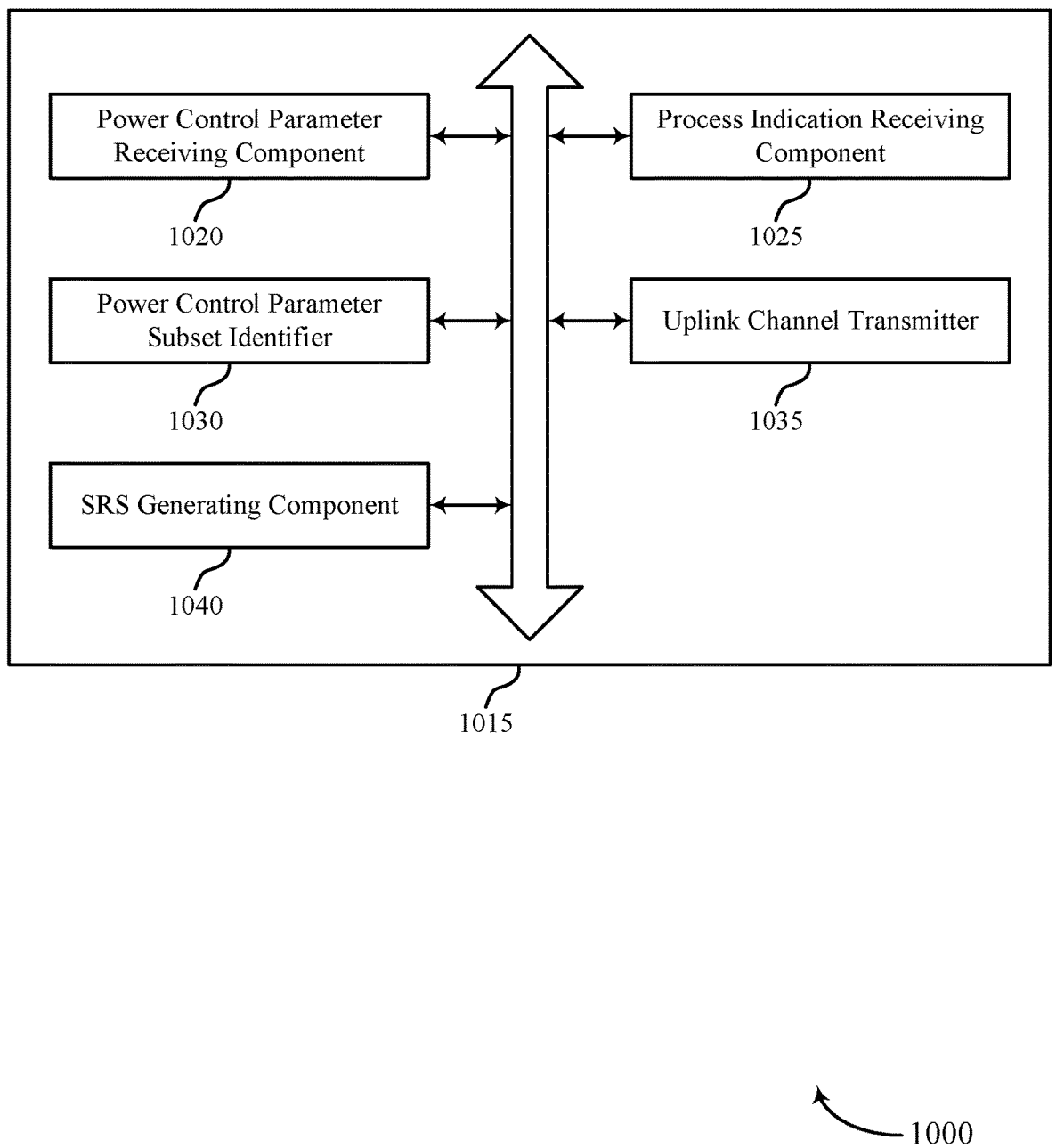
FIG. 10 shows a block diagram of a user equipment (UE) communications manager that supports uplink power control in wireless systems in accordance with aspects of the present disclosure.

FIG. 10 shows a block diagram 1000 of a UE communications manager 1015 that supports uplink power control in wireless systems in accordance with aspects of the present disclosure. The UE communications manager 1015 may be an example of aspects of a UE communications manager 1115 described with reference to FIGS. 8, 9, and 11. The UE communications manager 1015 may include a power control parameter receiving component 1020, a process indication receiving component 1025, a power control parameter subset identifier 1030, an uplink channel transmitter 1035, and an SRS generating component 1040. Each of these modules may communicate, directly or indirectly, with one another (e.g., via one or more buses).

The power control parameter receiving component 1020 may receive, from a base station, a set of power control parameters for an uplink channel. In some cases, receiving the set of power control parameters includes: receiving one or more power control parameters via RRC signaling. In some cases, the set of power control parameters includes a power offset, an alpha value, a closed loop power control parameter, a transport format indicator, or a combination thereof.

The process indication receiving component 1025 may receive, from the base station, an indication of a process associated with the uplink channel. In some cases, receiving the indication of the process includes: receiving, via DCI, a process index that corresponds to the process, a power control adjustment state that corresponds to the process, or a combination thereof. In some cases, the process includes a PUSCH process and the set of power control parameters correspond to multiple PUSCH power control loops. In some cases, the PUSCH process is associated with a CoMP transmission, a non-CoMP transmission, an anchored uplink slot, a default uplink slot, a switched uplink slot, or any combination thereof.

The power control parameter subset identifier 1030 may identify a subset of power control parameters based on the indication of the process. In some cases, identifying the subset of power control parameters includes: selecting the subset of power control parameters from the set of power control parameters based on the indication of the process. In some cases, the subset of power control parameters is identified based on the process index. In some cases, the power control adjustment state is subframe dependent, slot dependent, or mini-slot dependent. In some cases, the subset of power control parameters corresponds to the process associated with the uplink channel.

The uplink channel transmitter 1035 may transmit the uplink channel that corresponds to the process in accordance with the identified subset of the power control parameters, transmit the uplink channel includes transmitting the pre-coded SRS or the un-precoded SRS, and transmit the uplink channel includes transmitting a PUSCH.

The SRS generating component 1040 may generate a precoded SRS or an un-precoded SRS based on a channel measurement process indicated by the process. In some cases, the channel measurement process is based on cross-link interference. In some cases, the channel measurement process includes a downlink channel sounding with channel reciprocity or an uplink channel sounding.

Figure 11:
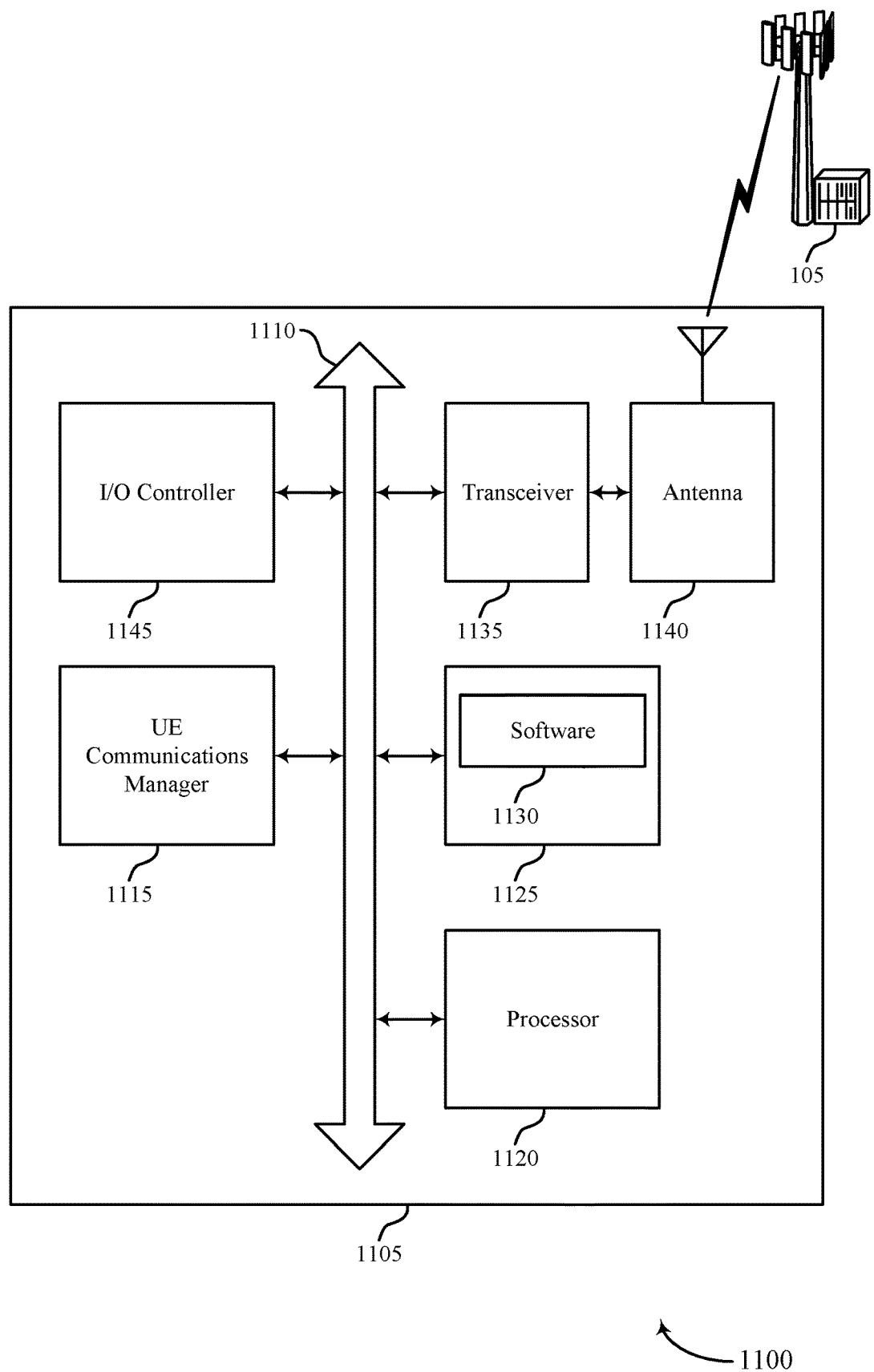
FIG. 11 illustrates a block diagram of a system including a device that supports uplink power control in wireless systems in accordance with aspects of the present disclosure.

FIG. 11 shows a block diagram of a system 1100 including a device 1105 that supports uplink power control in wireless systems in accordance with aspects of the present disclosure. The device 1105 may be an example of or include the components of a UE 115 as described herein, for example, with reference to FIG. 1. The device 1105 may include components for bi-directional voice and data communications including components for transmitting and receiving communications, including a UE communications manager 1115, a processor 1120, memory 1125, software 1130, a transceiver 1135, an antenna 1140, and an I/O controller 1145. These components may be in electronic communication via one or more buses (e.g., a bus 1110). The device 1105 may communicate wirelessly with one or more base stations 105 as described herein, for example, with reference to FIG. 1.

The processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1120 may be configured to operate a memory array using a memory controller. In other cases, a memory controller may be integrated into the processor 1120. The processor 1120 may be configured to execute computer-readable instructions stored in a memory to perform various functions (e.g., functions or tasks supporting uplink power control in wireless systems).

The memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

The software 1130 may include code to implement aspects of the present disclosure, including code to support uplink power control in wireless systems. The software 1130 may be stored in a non-transitory computer-readable medium such as system memory or other memory. In some cases, the software 1130 may not be directly executable by the processor but may cause a computer (e.g., when compiled and executed) to perform functions described herein.

The transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

The I/O controller 1145 may manage input and output signals for device 1105. The I/O controller 1145 may also manage peripherals not integrated into device 1105. In some cases, the I/O controller 1145 may represent a physical connection or port to an external peripheral. In some cases, the I/O controller 1145 may utilize an operating system such as iOS®, ANDROID®, MS-DOS®, MS-WINDOWS®, OS/2®, UNIX®, LINUX®, or another known operating system. In other cases, the I/O controller 1145 may represent or interact with a modem, a keyboard, a mouse, a touchscreen, or a similar device. In some cases, the I/O controller 1145 may be implemented as part of a processor. In some cases, a user may interact with the device 1105 via the I/O controller 1145 or via hardware components controlled by the I/O controller 1145.

Figure 12:
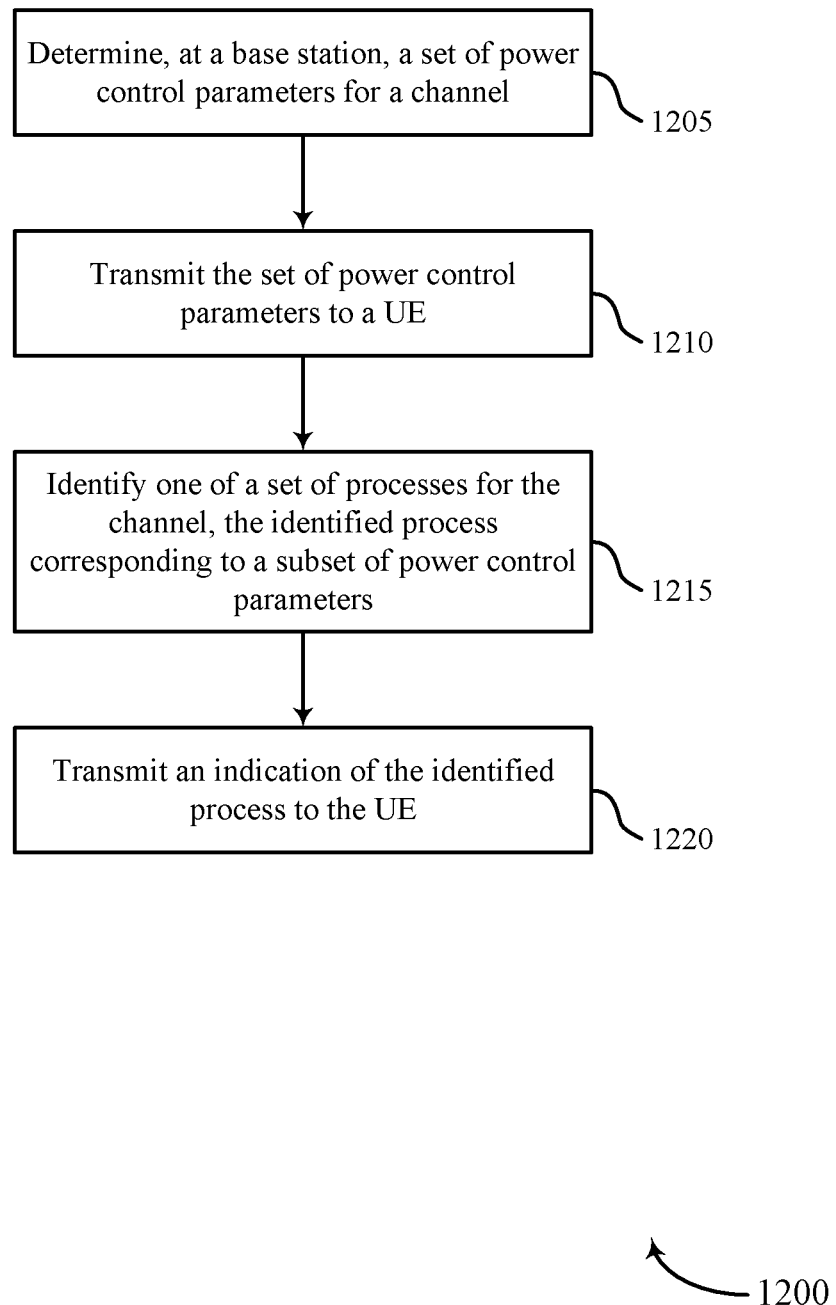
FIGS. 12 through 14 show flowcharts illustrating methods for uplink power control in wireless systems in accordance with aspects of the present disclosure.

FIG. 12 shows a flowchart illustrating a method 1200 for uplink power control in wireless systems in accordance with aspects of the present disclosure. The operations of the method 1200 may be implemented by a base station 105 or its components as described herein. For example, the operations of the method 1200 may be performed by a base station communications manager as described with reference to FIGS. 4 through 7. In some examples, a base station may execute a set of codes to control the functional elements of the device to perform the functions described below. Additionally, or alternatively, the base station 105 may perform aspects of the functions described below using special-purpose hardware.

At 1205, the base station may determine a set of power control parameters for a channel. The operations of 1205 may be performed according to the methods described herein. In certain examples, aspects of the operations of 1205 may be performed by a power control parameter determining component as described with reference to FIGS. 4 through 7.

At 1210, the base station may transmit the set of power control parameters to a UE. The operations of 1210 may be performed according to the methods described herein. In certain examples, aspects of the operations of 1210 may be performed by a power control parameter transmitting component as described with reference to FIGS. 4 through 7.

At 1215, the base station may identify one of a plurality of processes for the channel, the identified process corresponding to a subset of power control parameters. The operations of 1215 may be performed according to the methods described herein. In certain examples, aspects of the operations of 1215 may be performed by a channel process identifier as described with reference to FIGS. 4 through 7.

At 1220, the base station may transmit an indication of the identified process to the UE. The operations of 1220 may be performed according to the methods described herein. In certain examples, aspects of the operations of 1220 may be performed by a process indicating component as described with reference to FIGS. 4 through 7.

Figure 13:
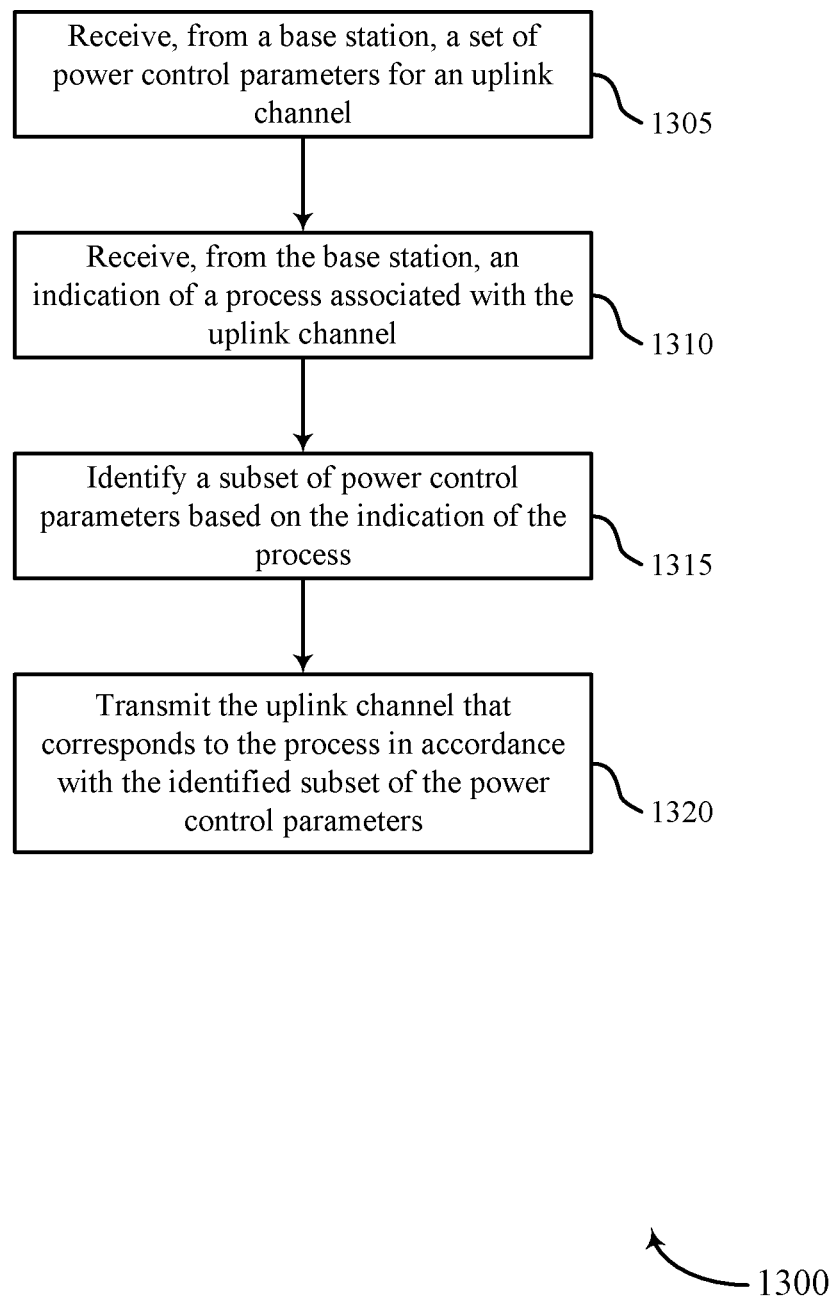

FIG. 13 shows a flowchart illustrating a method 1300 for uplink power control in wireless systems in accordance with aspects of the present disclosure. The operations of method 1300 may be implemented by a UE 115 or its components as described herein. For example, the operations of method 1300 may be performed by a UE communications manager as described with reference to FIGS. 8 through 11. In some examples, a UE may execute a set of codes to control the functional elements of the device to perform the functions described below. Additionally, or alternatively, the UE may perform aspects of the functions described below using special-purpose hardware.

At 1305, the UE may receive, from a base station, a set of power control parameters for an uplink channel. The operations of 1305 may be performed according to the methods described herein. In certain examples, aspects of the operations of 1305 may be performed by a power control parameter receiving component as described with reference to FIGS. 8 through 11.

At 1310, the UE may receive, from the base station, an indication of a process associated with the uplink channel. The operations of 1310 may be performed according to the methods described herein. In certain examples, aspects of the operations of 1310 may be performed by a process indication receiving component as described with reference to FIGS. 8 through 11.

At 1315, the UE may identify a subset of power control parameters based on the indication of the process. The operations of 1315 may be performed according to the methods described herein. In certain examples, aspects of the operations of 1315 may be performed by a power control parameter subset identifier as described with reference to FIGS. 8 through 11.

At 1320, the UE may transmit the uplink channel that corresponds to the process in accordance with the identified subset of the power control parameters. The operations of 1320 may be performed according to the methods described herein. In certain examples, aspects of the operations of 1320 may be performed by a uplink channel transmitter as described with reference to FIGS. 8 through 11.

Figure 14:
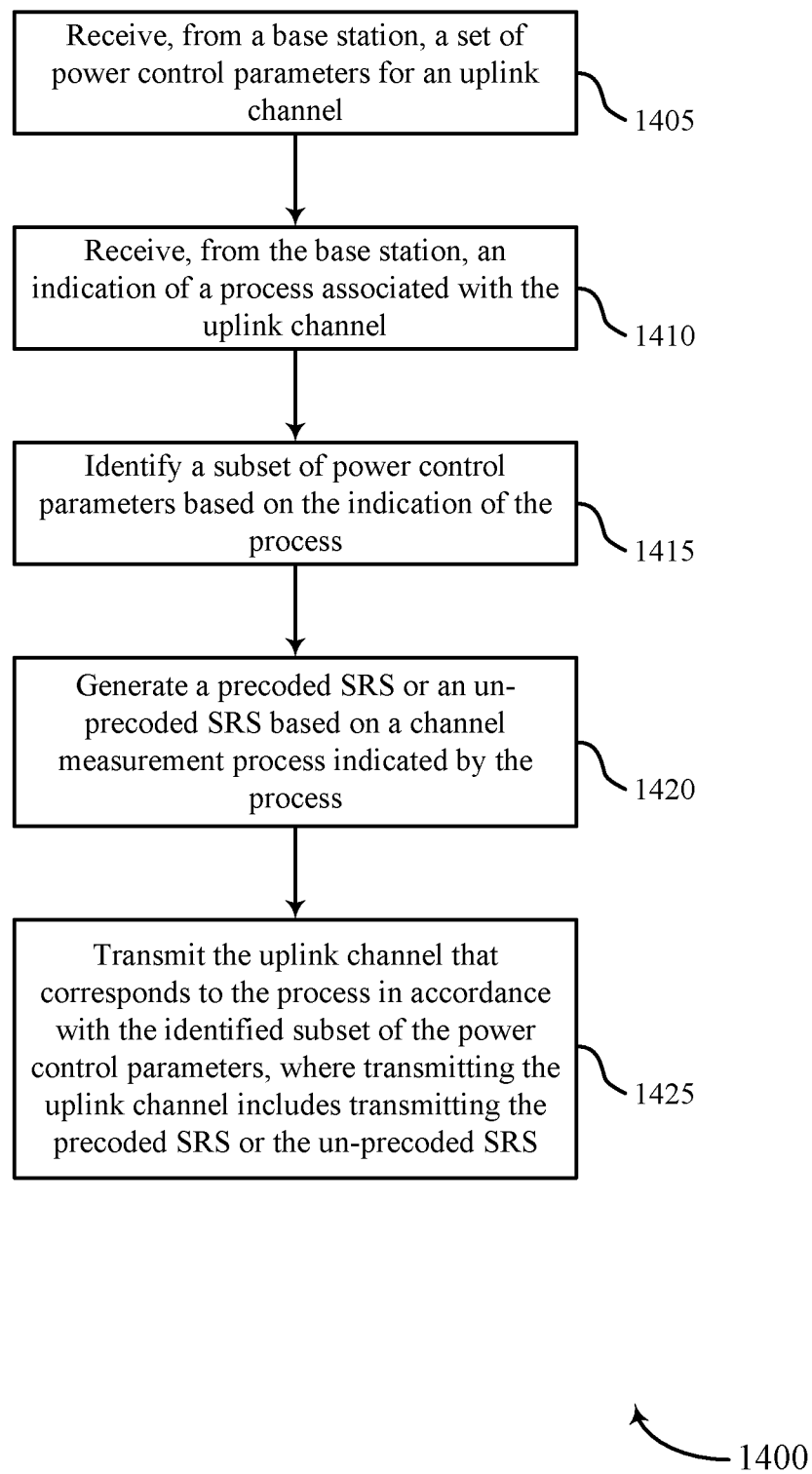

FIG. 14 shows a flowchart illustrating a method 1400 for uplink power control in wireless systems in accordance with aspects of the present disclosure. The operations of method 1400 may be implemented by a UE 115 or its components as described herein. For example, the operations of method 1400 may be performed by a UE communications manager as described with reference to FIGS. 8 through 11. In some examples, a UE may execute a set of codes to control the functional elements of the device to perform the functions described below. Additionally, or alternatively, the UE may perform aspects of the functions described below using special-purpose hardware.

At 1405, the UE may receive, from a base station, a set of power control parameters for an uplink channel. The operations of 1405 may be performed according to the methods described herein. In certain examples, aspects of the operations of 1405 may be performed by a power control parameter receiving component as described with reference to FIGS. 8 through 11.

At 1410, the UE may receive, from the base station, an indication of a process associated with the uplink channel. The operations of 1410 may be performed according to the methods described herein. In certain examples, aspects of the operations of 1410 may be performed by a process indication receiving component as described with reference to FIGS. 8 through 11.

At 1415, the UE may identify a subset of power control parameters based on the indication of the process. The operations of 1415 may be performed according to the methods described herein. In certain examples, aspects of the operations of 1415 may be performed by a power control parameter subset identifier as described with reference to FIGS. 8 through 11.

At 1420, the UE may generate a precoded SRS or an un-precoded SRS based on a channel measurement process indicated by the process. The operations of 1420 may be performed according to the methods described herein. In certain examples, aspects of the operations of 1420 may be performed by a SRS generating component as described with reference to FIGS. 8 through 11.

At 1425, the UE may transmit the uplink channel that corresponds to the process in accordance with the identified subset of the power control parameters, where transmitting the uplink channel includes transmitting the precoded SRS or the un-precoded SRS. The operations of 1425 may be performed according to the methods described herein. In certain examples, aspects of the operations of 1425 may be performed by a uplink channel transmitter as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (Wi Universal Terrestrial Radio Access MAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   receiving, from a base station, a set of power control parameters for an uplink channel;
   receiving, from the base station, a channel measurement process indication for the uplink channel, wherein the channel measurement process indication indicates one of: a first channel measurement process or a second channel measurement process;
   identifying, based at least in part on whether the channel measurement process indication indicates the first channel measurement process or the second channel measurement process, one of: a first subset of the set of power control parameters that is associated with the first channel measurement process or a second subset of the set of power control parameters that is associated with the second channel measurement process; and
   transmitting a reference signal over the uplink channel according to the channel measurement process indication using the identified subset of power control parameters.

2. The method of claim 1, further comprising:
   generating a precoded sounding reference signal (SRS) or an un-precoded SRS based at least in part on the channel measurement process indication,
   wherein transmitting the reference signal over the uplink channel comprises transmitting the precoded SRS or the un-precoded SRS.

3. The method of claim 2, wherein the channel measurement process is based at least in part on cross-link interference.

4. The method of claim 2, wherein the channel measurement process comprises a downlink channel sounding with channel reciprocity or an uplink channel sounding.

5. The method of claim 1, wherein receiving the channel measurement process indication comprises:
   receiving, via downlink control information (DCI), a process index that corresponds to the channel measurement process, a power control adjustment state that corresponds to the channel measurement process, or a combination thereof.

6. The method of claim 5, wherein the subset of power control parameters are identified based at least in part on the process index.

7. The method of claim 5, wherein the power control adjustment state is subframe dependent, slot dependent, or mini-slot dependent.

8. The method of claim 1, wherein receiving the set of power control parameters comprises:
   receiving one or more power control parameters via radio resource control (RRC) signaling.

9. The method of claim 1, wherein the set of power control parameters comprises a power offset, an alpha value, a closed loop power control parameter, a transport format indicator, or a combination thereof.

10. A method for wireless communications, comprising:
determining, at a base station, a set of power control parameters for a channel;
transmitting the set of power control parameters to a user equipment (UE);
identifying a channel measurement process from a plurality of channel measurement processes for the channel, wherein the plurality of channel measurement processes comprise a first channel measurement process and a second channel measurement process, the first channel measurement process corresponding to a first subset of power control parameters and the second channel measurement process corresponding to a second subset of power control parameters; and
transmitting a channel measurement process indication to the UE according to the identified channel measurement process.

11. The method of claim 10, wherein the identified channel measurement process comprises receiving a precoded sounding reference signal (SRS) or an un-precoded SRS.

12. The method of claim 11, wherein the identified channel measurement process is based at least in part on cross-link interference.

13. The method of claim 11, wherein the identified channel measurement process comprises a downlink channel sounding with channel reciprocity or an uplink channel sounding.

14. The method of claim 10, wherein determining the set of power control parameters comprises:
configuring multiple sets of process-specific power control parameters.

15. The method of claim 10, wherein determining the set of power control parameters comprises:
configuring multiple power control parameters for a plurality of channels.

16. The method of claim 10, wherein transmitting the set of power control parameters to the UE comprises:
transmitting one or more power control parameters via radio resource control (RRC) signaling.

17. The method of claim 10, wherein identifying the channel measurement process comprises:
selecting the channel measurement process from the plurality of channel measurement processes based at least in part on the UE being capable of performing the selected channel measurement process.

18. The method of claim 10, wherein the set of power control parameters comprises a power offset, an alpha value, a closed loop power control parameter, a transport format indicator, or a combination thereof.

19. The method of claim 10, wherein transmitting the channel measurement process indication to the UE comprises:
transmitting, via downlink control information (DCI), a process index that corresponds to the identified channel measurement process, a power control adjustment state that corresponds to the identified channel measurement process, or a combination thereof.

20. An apparatus for wireless communications, comprising:
a processor,
memory in electronic communication with the processor; and
instructions stored in the memory, wherein the instructions are executable by the processor to:
receive, from a base station, a set of power control parameters for an uplink channel;
receive, from the base station, a channel measurement process indication for the uplink channel, wherein the channel measurement process indication indicates one of: a first channel measurement process or a second channel measurement process;
identify, based at least in part on whether the channel measurement process indication indicates the first channel measurement process or the second channel measurement process, one of: a first subset of the set of power control parameters that is associated with the first channel measurement process or a second subset of the set of power control parameters that is associated with the second channel measurement process; and
transmit a reference signal over the uplink channel according to the channel measurement process indication using the identified subset of power control parameters.

21. The apparatus of claim 20, wherein the instructions are further executable by the processor to:
generate a precoded sounding reference signal (SRS) or an un-precoded SRS based at least in part on the channel measurement process indication, and
the instructions to transmit the reference signal over the uplink channel are executable by the processor to cause the apparatus to transmit the precoded SRS or the un-precoded SRS.

22. An apparatus for wireless communications, comprising:
a processor,
memory in electronic communication with the processor; and
instructions stored in the memory, wherein the instructions are executable by the processor to:
determine, at a base station, a set of power control parameters for a channel;
transmit the set of power control parameters to a user equipment (UE);
identify a channel measurement process from a plurality of channel measurement processes for the channel, wherein the plurality of channel measurement processes comprise a first channel measurement process and a second channel measurement process, the first channel measurement process corresponding to a first subset of power control parameters and the second channel measurement process corresponding to a second subset of power control parameters; and
transmit a channel measurement process indication to the UE according to the identified channel measurement process.

23. The method of claim 19, further comprising:
identifying the process index that corresponds to the identified channel measurement process, the process index indicative of the corresponding first subset of power control parameters or second subset of power control parameters.

24. The method of claim 19, wherein the power control adjustment state is subframe dependent, slot dependent, or mini-slot dependent.

* * * * *